(12) United States Patent
Ding et al.

(10) Patent No.: US 10,005,861 B2
(45) Date of Patent: Jun. 26, 2018

(54) METHODS FOR INCREASING POLYMER PRODUCTION RATES WITH HALOGENATED HYDROCARBON COMPOUNDS

(71) Applicant: Chevron Phillips Chemical Company LP, The Woodlands, TX (US)

(72) Inventors: Errun Ding, Bartlesville, OK (US); William B. Beaulieu, Tulsa, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days. days.

(21) Appl. No.: 15/497,249

(22) Filed: Apr. 26, 2017

(65) Prior Publication Data

US 2017/0355793 A1   Dec. 14, 2017

Related U.S. Application Data

(60) Provisional application No. 62/347,641, filed on Jun. 9, 2016.

(51) Int. Cl.
| | |
|---|---|
| *C08F 110/14* | (2006.01) |
| *C08F 110/02* | (2006.01) |
| *C08F 2/01* | (2006.01) |
| *C08F 2/12* | (2006.01) |
| *C08F 2/34* | (2006.01) |
| *C08F 2/38* | (2006.01) |
| *C08F 10/00* | (2006.01) |
| *B01J 19/06* | (2006.01) |
| *B01J 19/24* | (2006.01) |
| *C08F 210/16* | (2006.01) |
| *C08F 2/14* | (2006.01) |

(52) U.S. Cl.
CPC ............ *C08F 110/14* (2013.01); *B01J 19/06* (2013.01); *B01J 19/246* (2013.01); *C08F 2/01* (2013.01); *C08F 2/38* (2013.01); *C08F 10/00* (2013.01); *C08F 110/02* (2013.01); *C08F 210/16* (2013.01); *B01J 2219/24* (2013.01)

(58) Field of Classification Search
CPC .... C08F 2/12; C08F 2/34; C08F 10/02; C08F 4/6093; C08F 4/6293
USPC .................................................. 526/144, 206
See application file for complete search history.

(56) References Cited

U.S. PATENT DOCUMENTS

| | | | |
|---|---|---|---|
| 2,825,721 A | 3/1958 | Hogan et al. | |
| 2,913,446 A * | 11/1959 | Cull .................. | C08F 10/00 526/141 |
| 3,119,569 A | 1/1964 | Baricordi | |
| 3,225,023 A | 12/1965 | Hogan et al. | |
| 3,226,205 A | 12/1965 | Rohlfing | |
| 3,242,099 A | 3/1966 | Manyik et al. | |
| 3,242,150 A * | 3/1966 | Scoggin ............... | B01J 19/1837 159/4.01 |
| 3,248,179 A | 4/1966 | Norwood | |
| 3,622,521 A | 11/1971 | Hogan et al. | |
| 3,625,864 A | 12/1971 | Horvath | |
| 3,887,494 A | 6/1975 | Dietz | |
| 3,900,457 A | 8/1975 | Witt | |
| 3,976,632 A | 8/1976 | Delap | |
| 4,053,436 A | 10/1977 | Hogan et al. | |
| 4,081,407 A | 3/1978 | Short et al. | |
| 4,151,122 A | 4/1979 | McDaniel et al. | |
| 4,182,815 A | 1/1980 | McDaniel et al. | |
| 4,194,073 A * | 3/1980 | McDaniel .............. | C08F 10/00 526/106 |
| 4,247,421 A | 1/1981 | McDaniel et al. | |
| 4,248,735 A | 2/1981 | McDaniel et al. | |
| 4,296,001 A | 10/1981 | Hawley | |
| 4,297,460 A | 10/1981 | McDaniel et al. | |
| 4,301,034 A | 11/1981 | McDaniel | |
| 4,339,559 A | 7/1982 | McDaniel | |
| 4,364,842 A | 12/1982 | McDaniel et al. | |
| 4,364,854 A | 12/1982 | McDaniel et al. | |
| 4,364,855 A | 12/1982 | McDaniel et al. | |
| 4,392,990 A | 7/1983 | Witt | |
| 4,397,766 A | 8/1983 | Hawley et al. | |
| 4,397,769 A | 8/1983 | McDaniel et al. | |
| 4,405,501 A | 9/1983 | Witt | |
| 4,444,962 A | 4/1984 | McDaniel et al. | |
| 4,444,964 A | 4/1984 | McDaniel et al. | |
| 4,444,965 A | 4/1984 | McDaniel et al. | |
| 4,460,756 A | 7/1984 | McDaniel et al. | |
| 4,501,885 A | 2/1985 | Sherk et al. | |
| 4,504,638 A | 3/1985 | McDaniel et al. | |
| 4,547,557 A | 10/1985 | McDaniel | |

(Continued)

FOREIGN PATENT DOCUMENTS

| | | |
|---|---|---|
| EP | 0 703 246 | 3/1996 |
| EP | 1159314 B1 | 8/2004 |

(Continued)

OTHER PUBLICATIONS

Fluorobenzene Compound Information and Applications for GC (Gas Chromatography) and LC (Liquid Chromatography), Restek Pure Chromatography (www.restek.com), 2 pages (Copyright 2017).*

(Continued)

*Primary Examiner* — Fred M Teskin
(74) *Attorney, Agent, or Firm* — Merchant & Gould P.C.

(57) ABSTRACT

Methods for controlling the productivity of an olefin polymer in a polymerization reactor system using a halogenated hydrocarbon compound are disclosed. The productivity of the polymer can be increased via the addition of the halogenated hydrocarbon compound.

22 Claims, 6 Drawing Sheets

(56) References Cited

U.S. PATENT DOCUMENTS

| | | |
|---|---|---|
| 4,588,790 A | 5/1986 | Jenking, III et al. |
| 4,735,931 A | 4/1988 | McDaniel et al. |
| 4,806,513 A | 2/1989 | McDaniel et al. |
| 4,808,561 A | 2/1989 | Welborn, Jr. |
| 4,820,785 A | 4/1989 | McDaniel et al. |
| 4,855,271 A | 8/1989 | McDaniel et al. |
| 4,939,217 A | 7/1990 | Stricklen |
| 4,981,831 A | 1/1991 | Knudsen et al. |
| 4,988,657 A | 1/1991 | Martin et al. |
| 5,037,911 A | 8/1991 | McDaniel et al. |
| 5,179,178 A | 1/1993 | Stacy et al. |
| 5,191,132 A | 3/1993 | Patsidis et al. |
| 5,210,352 A | 5/1993 | Alt et al. |
| 5,219,817 A | 6/1993 | McDaniel et al. |
| 5,221,654 A | 6/1993 | McDaniel et al. |
| 5,237,025 A | 8/1993 | Benham et al. |
| 5,244,990 A | 9/1993 | Mitchell |
| 5,275,992 A | 1/1994 | Mitchell et al. |
| 5,347,026 A | 9/1994 | Patsidis et al. |
| 5,352,749 A | 10/1994 | DeChellis et al. |
| 5,399,636 A | 3/1995 | Alt et al. |
| 5,401,817 A | 3/1995 | Palackal et al. |
| 5,420,320 A | 5/1995 | Zenk et al. |
| 5,436,304 A | 7/1995 | Griffin et al. |
| 5,436,305 A | 7/1995 | Alt et al. |
| 5,451,649 A | 9/1995 | Zenk et al. |
| 5,480,848 A | 1/1996 | Geerts |
| 5,496,781 A | 3/1996 | Geerts et al. |
| 5,498,581 A | 3/1996 | Welch et al. |
| 5,541,272 A | 7/1996 | Schmid et al. |
| 5,554,795 A | 9/1996 | Frey et al. |
| 5,563,284 A | 10/1996 | Frey et al. |
| 5,565,175 A | 10/1996 | Hottovy et al. |
| 5,565,592 A | 10/1996 | Patsidis et al. |
| 5,571,880 A | 11/1996 | Alt et al. |
| 5,575,979 A | 11/1996 | Hanson |
| 5,594,078 A | 1/1997 | Welch et al. |
| 5,610,247 A | 3/1997 | Alt et al. |
| 5,627,247 A | 5/1997 | Alt et al. |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,705,478 A | 1/1998 | Boime |
| 5,705,579 A | 1/1998 | Hawley et al. |
| 5,739,220 A | 4/1998 | Shamshoum et al. |
| 5,990,251 A | 11/1999 | Gelus |
| 6,107,230 A | 8/2000 | McDaniel et al. |
| 6,165,929 A | 12/2000 | McDaniel et al. |
| 6,239,235 B1 | 5/2001 | Hottovy et al. |
| 6,262,191 B1 | 7/2001 | Hottovy et al. |
| 6,294,494 B1 | 9/2001 | McDaniel et al. |
| 6,300,271 B1 | 10/2001 | McDaniel et al. |
| 6,316,553 B1 | 11/2001 | McDaniel et al. |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,524,987 B1 | 2/2003 | Collins et al. |
| 6,548,441 B1 | 4/2003 | McDaniel et al. |
| 6,548,442 B1 | 4/2003 | McDaniel et al. |
| 6,576,583 B1 | 6/2003 | McDaniel et al. |
| 6,613,712 B1 | 9/2003 | McDaniel et al. |
| 6,632,894 B1 | 10/2003 | McDaniel et al. |
| 6,653,416 B2 | 11/2003 | McDaniel et al. |
| 6,667,274 B1 | 12/2003 | Hawley et al. |
| 6,750,302 B1 | 6/2004 | McDaniel et al. |
| 6,831,141 B2 | 12/2004 | McDaniel et al. |
| 6,833,338 B2 | 12/2004 | McDaniel et al. |
| 6,833,415 B2 | 12/2004 | Kendrick et al. |
| 7,026,494 B1 | 4/2006 | Yang et al. |
| 7,041,617 B2 | 5/2006 | Jensen et al. |
| 7,199,073 B2 | 4/2007 | Martin |
| 7,226,886 B2 | 6/2007 | Jayaratne et al. |
| 7,294,599 B2 | 11/2007 | Jensen et al. |
| 7,312,283 B2 | 12/2007 | Martin et al. |
| 7,417,097 B2 | 8/2008 | Yu et al. |
| 7,517,939 B2 | 4/2009 | Yang et al. |
| 7,531,606 B2 | 5/2009 | Hendrickson |
| 7,598,327 B2 | 10/2009 | Shaw |
| 7,601,665 B2 | 10/2009 | McDaniel et al. |
| 7,615,596 B2 | 11/2009 | Burns et al. |
| 7,619,047 B2 | 11/2009 | Yang et al. |
| 7,884,163 B2 | 2/2011 | McDaniel et al. |
| 7,919,639 B2 | 4/2011 | Murray et al. |
| 8,080,681 B2 | 12/2011 | Murray et al. |
| 8,309,485 B2 | 11/2012 | Yang et al. |
| 8,471,085 B2 | 6/2013 | Sydora |
| 8,623,973 B1 | 1/2014 | McDaniel et al. |
| 8,703,886 B1 | 4/2014 | Yang et al. |
| 8,822,608 B1 | 9/2014 | Bhandarkar et al. |
| 8,835,582 B2 | 9/2014 | Cann et al. |
| 9,023,959 B2 | 5/2015 | McDaniel et al. |
| 9,163,098 B2 | 10/2015 | McDaniel et al. |
| 9,279,023 B2 | 3/2016 | Marissal et al. |
| 2002/0007024 A1 | 1/2002 | Ford et al. |
| 2003/0100688 A1 | 5/2003 | Farrer et al. |
| 2004/0059070 A1 | 3/2004 | Whitte et al. |

FOREIGN PATENT DOCUMENTS

| | | |
|---|---|---|
| EP | 2 374 537 | 10/2011 |
| JP | H08 134124 | 5/1996 |
| KR | 100626900 | 9/2006 |
| WO | WO 00/52067 | 9/2000 |
| WO | WO 2011/103402 | 8/2011 |

OTHER PUBLICATIONS

International Search Report and the Written Opinion of the International Searching Authority in PCT/US2017/033852 dated Aug. 8, 2017, 13 pages.

Bird et al., entitled "*Dynamics of Polymeric Liquids,*" vol. 1, Fluid Mechanics, $2^{nd}$ Edition, John Wiley & Sons, 1987, 3 pages.

Cotton et al., entitled "*Advanced Inorganic Chemistry,*" $6^{th}$ Ed., Wiley-Interscience, 1999, 4 pages.

*Hawley's Condensed Chemical Dictionary*, 11th Ed., John Wiley & Sons, 1995, 3 pages.

Hieber et al., entitled "*Shear-Rate-Dependence Modeling of Polymer Melt Viscosity,*" Polymer Engineering and Science, 1992, 32(14), pp. 931-938.

Hieber et al., entitled "*Some correlations involving the shear viscosity of polystyrene melts,*" Rheologica Acta, 1989, vol. 28, pp. 321-332.

\* cited by examiner ically, any designations disclosed herein such as "about" or "approximately" are not to be understood as imposing any lower limit on the range to which they are applied.

METHODS FOR INCREASING POLYMER PRODUCTION RATES WITH HALOGENATED HYDROCARBON COMPOUNDS

REFERENCE TO RELATED APPLICATION

This application claims the benefit of U.S. Provisional Patent Application No. 62/347,641, filed on Jun. 9, 2016, the disclosure of which is incorporated herein by reference in its entirety.

FIELD OF THE INVENTION

The present disclosure concerns methods for controlling the productivity of an olefin polymerization reaction, and more particularly relates to the use of halogenated hydrocarbon compounds to increase the productivity of an olefin polymer in a polymerization reactor system.

BACKGROUND OF THE INVENTION

There are various methods that can be employed to adjust or control the productivity of a polymerization reaction to produce a desired olefin polymer. For instance, the catalyst composition and the polymerization reaction conditions can affect the productivity. However, additional methods of adjusting or controlling the productivity are needed which do not require changes in the catalyst composition or the polymerization reaction conditions and, beneficially, can reduce the amount of catalyst residue in the olefin polymer and the overall production costs. Accordingly, it is to these ends that the present disclosure is generally directed.

SUMMARY OF THE INVENTION

Various processes and methods related to the control of olefin polymerization reactions are disclosed herein. In one aspect, a method of controlling a polymerization reaction in a polymerization reactor system is disclosed, and in this aspect, the method can comprise (i) contacting a transition metal-based catalyst system with an olefin monomer and an optional olefin comonomer in the polymerization reactor system under polymerization conditions to produce an olefin polymer; and (ii) introducing an amount of a halogenated hydrocarbon compound into the polymerization reactor system to increase a productivity of the olefin polymer.

A process for producing an olefin polymer at a target productivity also is disclosed herein, and in this aspect, the process can comprise (a) contacting a transition metal-based catalyst system with an olefin monomer and an optional olefin comonomer in a polymerization reactor system under polymerization conditions; and (b) controlling an amount of a halogenated hydrocarbon compound introduced into the polymerization reactor system to produce the olefin polymer at the target productivity.

An olefin polymerization process is disclosed in another aspect of this invention, and in this aspect, the olefin polymerization process can comprise contacting a transition metal-based catalyst system with an olefin monomer and an optional olefin comonomer in a polymerization reactor system under polymerization conditions, and in the presence of a halogenated hydrocarbon compound, to produce an olefin polymer. The productivity of the olefin polymer in this process can be greater than that obtained under the same polymerization conditions without the halogenated hydrocarbon compound.

In these methods and processes, the productivity of the olefin polymer generally can increase as the amount of the halogenated hydrocarbon compound added to the polymerization reactor system is increased. Further, other metrics related to the efficiency of the olefin polymerization reaction also can be improved due the addition of the halogenated hydrocarbon compound, such as the polymer production rate and/or the activity of the catalyst system.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description of specific aspects and examples presented herein.

DEFINITIONS

Figure 1:
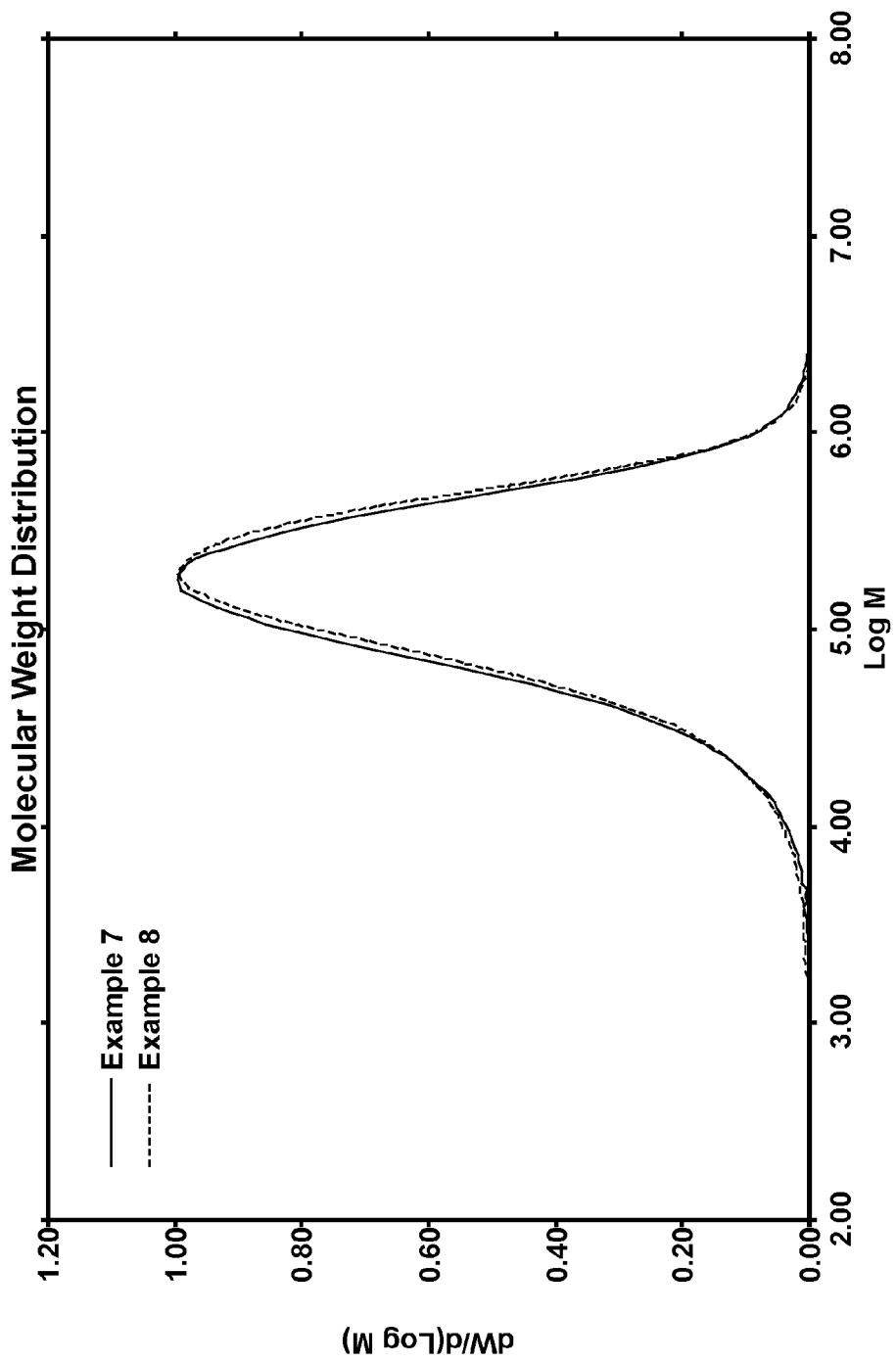
FIG. 1 presents a plot of the molecular weight distributions of the polymers of Examples 7-8, produced with a metallocene-based catalyst system.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter can be described such that, within particular aspects, a combination of different features can be envisioned. For each and every aspect and each and every feature disclosed herein, all combinations that do not detrimentally affect the designs, compositions, processes, or methods described herein are contemplated with or without explicit description of the particular combination. Additionally, unless explicitly recited otherwise, any aspect or feature disclosed herein can be combined to describe inventive designs, compositions, processes, or methods consistent with the present disclosure.

In this disclosure, while compositions and methods are often described in terms of "comprising" various components or steps, the compositions and methods can also "consist essentially of" or "consist of" the various components or steps, unless stated otherwise. For example, a catalyst composition consistent with an aspect of the present invention can comprise; alternatively, can consist essentially of; or alternatively, can consist of; a metallocene compound, an activator-support, and optionally, a co-catalyst.

The terms "a," "an," and "the" are intended to include plural alternatives, e.g., at least one, unless otherwise specified. For instance, the disclosure of "a reactor" or "a halogenated hydrocarbon compound" is meant to encompass one, or combinations of more than one, reactor or halogenated hydrocarbon compound, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "transition metal" encompasses the elements of the First, Second and Third Transition Metal series of Groups 3-12 (e.g., Groups 4-12) in the Periodic Table of the Elements, and includes but is not limited to Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg. The term "complexes" or "complex," particularly when used in association with the term transition metal, means those components in which a part of the molecular bonding is of the coordinate type in which a chemical bond between two atoms is formed by a shared pair of electrons, and the pair of electrons has been supplied by one of the two atoms, in accordance with the McGraw Hill Dictionary of Scientific Terms, Fifth Edition, McGraw-Hill, Inc., New York, 1994.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The term "substituted" when used to describe a group, for example, when referring to a substituted analog of a particular group, is intended to describe any non-hydrogen moiety that formally replaces a hydrogen atom in that group, and is intended to be non-limiting. A group or groups can also be referred to herein as "unsubstituted" or by equivalent terms such as "non-substituted," which refers to the original group in which a non-hydrogen moiety does not replace a hydrogen atom within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "alkane" whenever used in this specification and claims refers to a saturated hydrocarbon compound. Other identifiers can be utilized to indicate the presence of particular groups in the alkane (e.g., halogenated alkane indicates that the presence of one or more halogen atoms replacing an equivalent number of hydrogen atoms in the alkane). Representative examples of halogens include fluorine (F), chlorine (Cl), bromine (Br), and iodine (I).

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Accordingly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers or oligomers.

The terms Mn, Mw, and Mz, as used herein, are defined as follows: Mn: number-average molecular weight; Mw: weight-average molecular weight; and Mz: z-average molecular weight. These values are determined by calculations on the basis of molecular weight distribution curves determined using gel permeation chromatography (GPC), also known as size-exclusion chromatography (SEC).

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the transition metal(s) or transition metal compound(s), or the activator (e.g., an aluminoxane or an activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The term "contacting" is used herein to describe methods, processes, and compositions wherein the components are contacted or combined together in any order, in any manner, and for any length of time, unless otherwise specified. For example, the components can be contacted by blending or mixing. Further, unless otherwise specified, the contacting of any component can occur in the presence or absence of any other component of the methods, processes, and compositions described herein. Combining additional materials or components can be done by any suitable technique. Further, "contacting" two or more components can result in a solution, a slurry, a mixture, a reaction mixture, or a reaction product.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the polymerization reaction temperature consistent with aspects of this invention. By a disclosure that the polymerization reaction conditions can comprise a polymerization reaction temperature in a range from about 60° C. to about 120° C., the intent is to recite that the temperature can be any temperature within the range and, for example, can be equal to about 60° C., about 65° C., about 70° C., about 75° C., about 80° C., about 85° C., about 90° C., about 95° C., about 100° C., about 105° C., about 110° C., about 115° C., or about 120° C. Additionally, the temperature can be within any range from about 60° C. to about 120° C. (for example, the temperature can be in a range from about 70° C. to about 110° C.), and this also includes any combination of ranges between about 60° C. and about 120° C. Likewise, all other ranges disclosed herein should be interpreted in a manner similar to these examples.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

Disclosed herein are methods and processes directed to controlling the productivity of olefin polymerization reactions in polymerization reactor systems via the addition of a halogenated hydrocarbon compound. In these methods and processes, the amount of the halogenated hydrocarbon compound added to the reactor system can be used to adjust the productivity of the olefin polymer, and additionally or alternatively, can be used to adjust the catalyst activity of the transition metal-based catalyst system, the polymer production rate, or both. The olefin polymerization reaction can be conducted in any suitable polymerization reactor system, which can contain one reactor, or alternatively, two or more reactors in series or parallel. Beneficially, the disclosed methods and processes can reduce the overall polymer production costs due to the increased productivity of the olefin polymer, and moreover, can reduce the amount of catalyst residue present in the olefin polymer.

For example, in one aspect, a method of controlling a polymerization reaction in a polymerization reactor system is disclosed. In this aspect, the method can comprise:

(i) contacting a transition metal-based catalyst system with an olefin monomer and an optional olefin comonomer in the polymerization reactor system under polymerization conditions to produce an olefin polymer; and (ii) introducing an amount of a halogenated hydrocarbon compound into the polymerization reactor system to increase a productivity of the olefin polymer.

Thus, the addition of the halogenated hydrocarbon compound (e.g., increasing the amount of the halogenated hydrocarbon compound) can increase the productivity of the olefin polymer. The "productivity" is the grams of polymer produced per gram of the catalyst system. Additionally or alternatively, the addition of the halogenated hydrocarbon compound (e.g., increasing the amount of the halogenated hydrocarbon compound) can increase the catalyst activity (grams of polymer produced per gram of the catalyst system per hour), or can increase the polymer production rate (grams of polymer produced per hour), or both.

In another aspect, a process for producing an olefin polymer at a target productivity is disclosed, and in this aspect, the process can comprise:

(a) contacting a transition metal-based catalyst system with an olefin monomer and an optional olefin comonomer in a polymerization reactor system under polymerization conditions; and (b) controlling an amount of a halogenated hydrocarbon compound introduced into the polymerization reactor system to produce the olefin polymer at the target productivity.

Thus, the addition of the halogenated hydrocarbon compound (e.g., increasing the amount of the halogenated hydrocarbon compound) can be used to produce an olefin polymer with a target productivity (or alternatively, a target catalyst activity or a target production rate, or both).

In yet another aspect, an olefin polymerization process is disclosed. In this aspect, the process can comprise contacting a transition metal-based catalyst system with an olefin monomer and an optional olefin comonomer in a polymerization reactor system under polymerization conditions, and in the presence of a halogenated hydrocarbon compound, to produce an olefin polymer. In this process, the productivity of the olefin polymer is greater than that obtained under the same polymerization conditions without the halogenated hydrocarbon compound.

In these methods and processes, the halogenated hydrocarbon compound can be introduced (e.g., added or injected) into the polymerization reactor system by any suitable means, for instance, alone, or with a carrier (e.g., a carrier gas or a carrier liquid). The halogenated hydrocarbon compound can be introduced into the polymerization reactor system at any suitable location within the reactor system. In one aspect, the halogenated hydrocarbon compound can be added directly into a polymerization reactor within the polymerization reactor system, while in another aspect, the halogenated hydrocarbon compound can be introduced into the polymerization reaction system at a feed or inlet location other than directly into a polymerization reactor, for example, in a recycle stream. In some aspects, the halogenated hydrocarbon compound can be added to the reactor by itself, while in other aspects, the halogenated hydrocarbon compound can be added to the reactor with a carrier or solvent, non-limiting examples of which can include, but are not limited to, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, and the like, or combinations thereof. In certain aspects, the halogenated hydrocarbon compound can be added to the reactor with an olefin monomer or comonomer, such as 1-butene, 1-hexene, or 1-octene, and the like. Thus, the halogenated hydrocarbon compound can be added to the reactor with a comonomer feed stream. In particular aspects contemplated herein, the halogenated hydrocarbon compound can be added to the polymerization reactor system with the catalyst system, or alternatively, with at least one component of the catalyst system. Thus, the halogenated hydrocarbon compound can be added to the reactor with a transition metal compound (e.g., a metallocene compound), or with a co-catalyst (e.g., an organoaluminum compound), or both. Additional feed options for a polymerization reactor system are described in U.S. Pat. No. 7,615,596, the disclosure of which is incorporated herein by reference in its entirety.

Generally, the features of the methods and processes disclosed herein (e.g., the transition metal-based catalyst system, the olefin monomer, the olefin comonomer, the polymerization conditions, the polymerization reactor system, the halogenated hydrocarbon compound, the amount of the halogenated hydrocarbon compound, the productivity of the olefin polymer, among others) are independently described herein, and these features can be combined in any combination to further describe the disclosed processes and methods.

In certain methods and processes, the transition metal-based catalyst system can be contacted with the olefin monomer and optionally an olefin comonomer in the polymerization reactor system, and a halogenated hydrocarbon compound can be added to the reactor system. As would be recognized by one of skill in the art, additional components can be introduced into the polymerization reactor system in addition to these recited components, and such unrecited components are encompassed herein. For instance, in the operation of a polymerization reactor system—depending, of course, on the polymerization reactor type and the desired olefin polymer, among other factors—solvents, diluents, fluidizing gases, and/or recycle streams also can be added or introduced into the polymerization reactor and polymerization reactor system.

As would be readily recognized by those of skill in the art, many variables can be used to impact the productivity of the olefin polymer, including but not limited to, the reaction temperature, reaction pressure, catalyst system feed rate, monomer/commoner feed rate, and the use of hydrogen, among others. Consistent with aspects disclosed herein, these parameters can be held substantially constant (e.g., within +/−5%), for example, for the production of a particular polymer grade. In such circumstances, the addition of the halogenated hydrocarbon compound can be used to control, adjust, and/or fine-tune the productivity of that particular polymer grade, without having to vary other polymerization reaction conditions, or without having to vary catalyst system and reactant feed rates.

Accordingly, in some aspects, the polymerization conditions can be held substantially constant (e.g., within +/−5%), for example, for the production of a particular polymer grade. Representative polymerization conditions include reaction temperature, reaction pressure, residence time, % solids, and the like. As above, in such circumstances, the addition of the halogenated hydrocarbon compound can be used to control, adjust and/or fine-tune the productivity of that particular polymer grade.

Optionally, if additional control parameters for the polymerization process are desired other than the use of a halogenated hydrocarbon compound, the methods and processes disclosed herein can further comprise a step of adjusting at least one polymerization condition (e.g., temperature, pressure, or residence time).

Unexpectedly, in these methods and processes, the weight-average molecular weight (Mw) of the olefin polymer can decrease as the amount of the halogenated hydrocarbon compound added to the polymerization reactor system is increased. In some instances, the Mw can decrease by at least 1%, by at least 2%, or by at least 5%, and often can decrease by up to 15%, up to 20%, up to 25%, or up to 40%. Also unexpectedly, the zero-shear viscosity ($\eta_o$) of the olefin polymer can decrease as the amount of the halogenated hydrocarbon compound added to the polymerization reactor system is increased. In some instances, the $\eta_o$ can decrease by at least 2%, by at least 4%, by at least 6%, or by at least 8%, and often can decrease by up to 20%, up to 40%, up to 60%, or up to 80%. Accordingly, in the disclosed methods and processes, the Mw of the olefin polymer can decrease, the zero-shear viscosity of the olefin polymer can decrease, or both the Mw and the zero-shear viscosity of the olefin polymer can decrease, as the amount of the halogenated hydrocarbon compound added to the polymerization reactor system is increased.

The halogenated hydrocarbon compound can be added to the polymerization reactor system (e.g., into a polymerization reactor) alone, with a carrier, or with the catalyst system. The amount of the halogenated hydrocarbon compound added to the reactor system is not particularly limited, so long as the amount of the halogenated hydrocarbon compound added to the reactor system is sufficient to impact the productivity of the olefin polymer as described herein. While not being limited thereto, the amount of the halogenated hydrocarbon compound added typically can be in a weight ratio range (in ppm) from about 1 ppm to about 5000 ppm. This ppm is based on the weight of the halogenated hydrocarbon compound to the total weight of the reactor contents. In some aspects, this weight ratio (in ppm) can be in a range from about 2 ppm to about 500 ppm, from about 5 ppm to about 2000 ppm, from about 5 ppm to about 250 ppm, from about 10 ppm to about 1500 ppm, from about 10 ppm to about 500 ppm, from about 15 ppm to about 2500 ppm, from about 15 ppm to about 750 ppm, or from about 15 ppm to about 250 ppm.

Moreover, and while not being limited thereto, the amount of the halogenated hydrocarbon compound added can be in a weight ratio range of the weight of the halogenated hydrocarbon compound to the weight of the catalyst system from about 0.01:1 to about 200:1. This ratio is based on the respective amounts of the halogenated hydrocarbon compound and the catalyst system fed into the reactor system (e.g., into a polymerization reactor). As a non-limiting example of a 4:1 weight ratio, in a continuous polymerization reactor system, the total amount of the catalyst system fed into the reactor(s) per time interval can be "Y" kg/hour; thus, the amount of the halogenated hydrocarbon compound fed into the reactor(s) would be equal to "4Y" kg/hour (kg of halogenated hydrocarbon compound per hour) for a 4:1 weight ratio. In some aspects, the weight ratio can be in a range from about 0.05:1 to about 40:1, from about 0.1:1 to about 15:1, from about 0.2:1 to about 8:1, from about 0.4:1 to about 4:1, from about 0.5:1 to about 100:1, or from about 0.5:1 to 20:1.

In an aspect, the halogenated hydrocarbon compound can be added into the polymerization reactor system continuously. For instance, the halogenated hydrocarbon compound can be added to the reactor whenever the olefin monomer or the catalyst components, or both, are added to the reactor. Alternatively, the halogenated hydrocarbon compound can be added periodically, on an as-needed basis, or pulsed to the reactor. Intermittent addition to a polymerization reactor is disclosed, for instance, in U.S. Pat. No. 5,739,220 and U.S. Patent Publication No. 2004/0059070, the disclosures of which are incorporated herein by reference in their entirety. The halogenated hydrocarbon compound also can be added to the reactor in a timed/metered pre-determined manner.

The methods and processes disclosed herein can be used to produce olefin polymers having various melt flow rate, density, and molecular weight properties. For example, the melt index (MI) of the olefin polymer (e.g., an ethylene homopolymer or an ethylene/α-olefin copolymer) can be less than about 50 g/10 min, less than about 25 g/10 min, less than about 10 g/10 min, or less than about 5 g/10 min. Contemplated ranges for the MI of olefin polymers produced by the methods and processes disclosed herein can include, but are not limited to, from 0 g/10 min to about 25 g/10 min, from 0 g/10 min to about 5 g/10 min, from 0 g/10 min to about 1 g/10 min, from 0 g/10 min to about 0.5 g/10 min, from about 0.1 g/10 min to about 50 g/10 min, from about 0.1 g/10 min to about 25 g/10 min, from about 0.1 g/10 min to about 10 g/10 min, from about 0.1 g/10 min to about 2 g/10 min, from about 0.1 g/10 min to about 1 g/10 min, or from about 0.1 g/10 min to about 0.8 g/10 min.

In an aspect, the density of olefin polymers produced by the methods and processes disclosed herein can be in a range from about 0.88 g/cc to about 0.97 g/cc, or from about 0.88 g/cc to about 0.96 g/cc. In some aspects, the density can be in a range from about 0.90 g/cc to about 0.96 g/cc, from about 0.91 g/cc to about 0.96 g/cc, from about 0.91 g/cc to about 0.94 g/cc, from about 0.92 g/cc to about 0.95 g/cc, or from about 0.92 g/cc to about 0.94 g/cc.

In an aspect, the weight-average molecular weight (Mw) of the olefin polymer produced by the methods and processes disclosed herein can be in a range from about 50,000 g/mol to about 1,000,000 g/mol, from about 100,000 g/mol to about 1,000,000 g/mol, or from about 50,000 g/mol to about 900,000 g/mol. In some aspects, the Mw can be in range from about 100,000 g/mol to about 900,000 g/mol, from about 100,000 g/mol to about 750,000 g/mol, from about 150,000 g/mol to about 900,000 g/mol, from 150,000 g/mol to about 750,000 g/mol, or from about 200,000 g/mol to about 700,000 g/mol. Ratios of Mw/Mn (and the breadth of the molecular weight distribution curve) for the olefin polymer can vary significantly based on the catalyst system employed and the desired properties of the olefin polymer, amongst other factors.

Consistent with an aspect of this invention, it is not required for hydrogen to be added to the polymerization reactor system. As one of ordinary skill in the art would recognize, hydrogen can be generated in-situ by the certain transition metal-based catalyst systems during the olefin polymerization process. In this aspect, there is "no added hydrogen" to the reactor system.

Although not required, however, hydrogen can be added to the polymerization reactor system in certain aspects. Optionally, for instance, the methods and processes provided herein can further comprise a step of adding hydrogen to the polymerization reactor system to adjust the weight-average molecular weight (Mw) of the olefin polymer, to adjust the melt index (MI) of the olefin polymer, or to adjust both the Mw and MI of the olefin polymer, if desired. Generally, the step of adding hydrogen can decrease the Mw, increase the MI, or both decrease the Mw and increase the MI, of the polymer.

In aspects where hydrogen is added to the polymerization reactor system, the hydrogen addition can be held substantially constant (e.g., within +/−20%), for example, for the production of a particular polymer grade. For instance, the ratio of hydrogen to the olefin monomer in the polymerization process can be controlled, often by the feed ratio of hydrogen to the olefin monomer entering the reactor. Further, the addition of comonomer (or comonomers) can be, and generally is, substantially constant throughout the polymerization run for a particular copolymer grade. However, in other aspects, it is contemplated that monomer, comonomer (or comonomers), or hydrogen, or combinations thereof, can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

For the production of an olefin polymer with certain desired polymer properties, a target productivity of the olefin polymer (or production rate of the olefin polymer, or catalyst activity of the catalyst system, or any combination thereof) can be established. Thus, when the olefin polymer with the desired polymer properties is produced, variables can be adjusted in order to achieve the targeted productivity of the olefin polymer (or production rate of the olefin polymer, or catalyst activity of the catalyst system, or any combination thereof). Accordingly, in some aspects, the processes and methods provided herein optionally can further comprise the steps of determining (or measuring) the productivity of the olefin polymer (or production rate of the olefin polymer, or catalyst activity of the catalyst system, or any combination thereof), and then adjusting the amount of the halogenated hydrocarbon compound introduced into the polymerization reactor system based on the difference between the measured productivity of the olefin polymer (or production rate of the olefin polymer, or catalyst activity of the catalyst system, or any combination thereof) and the target productivity of the olefin polymer (or production rate of the olefin polymer, or catalyst activity of the catalyst system, or any combination thereof). As a representative example, if the measured productivity of the olefin polymer (or production rate of the olefin polymer, or catalyst activity of the catalyst system, or any combination thereof) is lower than that of the target productivity of the olefin polymer (or production rate of the olefin polymer, or catalyst activity of the catalyst system, or any combination thereof), then the halogenated hydrocarbon compound can be added at an amount appropriate to make the measured productivity of the olefin polymer (or production rate of the olefin polymer, or catalyst activity of the catalyst system, or any combination thereof) equivalent to that of the target productivity of the olefin polymer (or production rate of the olefin polymer, or catalyst activity of the catalyst system, or any combination thereof). For instance, the feed rate of the halogenated hydrocarbon compound can be increased to increase the productivity of the olefin polymer (or production rate of the olefin polymer, or catalyst activity of the catalyst system, or any combination thereof).

Consistent with aspects disclosed herein, optionally and as-needed, various polymerization conditions or process variables can be adjusted or controlled during the operation of a polymerization reactor system, and such conditions or variables can include, but are not limited to, reaction temperature, reactor pressure, residence time, catalyst system flow rate into the reactor, monomer flow rate (and comonomer, if employed) into the reactor, olefin polymer output rate, recycle rate, hydrogen flow rate (if employed), reactor cooling status, slurry density, circulation pump power, and the like.

In each of the methods and process disclosed herein, the productivity of the olefin polymer (or production rate of the olefin polymer, or catalyst activity of the catalyst system, or any combination thereof) can increase as the amount of the halogenated hydrocarbon compound added to the polymerization reactor system increases. While not being limited thereto, the productivity of the olefin polymer (or production rate of the olefin polymer, or catalyst activity of the catalyst system, or any combination thereof) often can increase by from about 5% to about 350%, by from about 5% to about 200%, by from about 5% to about 100%, by from about 10% to about 300%, by from about 10% to about 150%, by from about 10% to about 100%, by from about 20% to about 350%, by from about 20% to about 250%, by from about 20% to about 150%, by from about 35% to about 200%, or by from about 35% to about 100%, due to the addition of the halogenated hydrocarbon compound.

Halogenated Hydrocarbon Compounds

Halogenated hydrocarbon compounds suitable for use herein can include, but are not limited to, halogenated aromatics compounds, halogenated alkane compounds, or combinations thereof, in which any halogen—either singly or in combination—can be present in the halogenated hydrocarbon compound. Often, the halogen can be bromine; alternatively, fluorine; alternatively, chlorine; or alternatively, both fluorine and chlorine.

In one aspect, the halogenated hydrocarbon compound can comprise a halogenated aromatic compound, in which at least one hydrogen atom of an aromatic compound (e.g., benzene, toluene, or xylene) is replaced with a halogen atom, such as fluorine, chlorine, or both. Illustrative and non-limiting examples of halogenated aromatic compounds can include bromobenzene, a dibromobenzene, a bromotoluene, chlorobenzene, a dichlorobenzene, a chlorotoluene, hexachlorobenzene, fluorobenzene, a difluorobenzene, a fluorotoluene, hexafluorobenzene, 1-bromo-4-fluorobenzene, 1-bromo-2-chlorobenzene, 1-chloro-3-fluorobenzene, 1-chloro-2-fluorobenzene, 2,5-dichloro-1-fluorobenzene, and the like, as well as combinations thereof.

In one aspect, the halogenated hydrocarbon compound can comprise a halogenated alkane compound, in which at least one hydrogen atom of an alkane compound (e.g., methane, ethane, propane, butane, or hexane) is replaced with a halogen atom, such as fluorine, chlorine, or both. Illustrative and non-limiting examples of halogenated alkane compounds can include carbon tetrachloride, tetrachloroethane, methyl chloride, methylene chloride, chloroform, tetrafluoromethane, trifluoromethane, difluoromethane, fluoromethane, hexafluoroethane, pentafluoroethane, 1,1,2,2-tetrafluoroethane, 1,1,1,2-tetrafluoroethane, 1,1,2-trifluoroethane, 1,1,1-trifluoroethane, 1,2-difluoroethane, 1,1-difluoroethane, fluoroethane, octafluoropropane, 1,1,2,2,3,3,3-heptafluoropropane, 1,1,1,2,3,3,3-heptafluoropropane, 1,1,1,2,2,3-hexafluoropropane, 1,1,1,2,3,3-hexafluoropropane, 1,1,1,3,3,3-hexafluoropropane, hexafluoropropane, pentafluoropropane, 1,1,2,2,3-pentafluoropropane, 1,1,2,3,3-pentafluoropropane, 1,1,1,2,3-pentafluoropropane, 1,1,1,3,3-pentafluoropropane, 1,1,2,2-tetrafluoropropane, trifluoropropane, difluoropropane, fluoropropane, octafluorocyclobutane, decafluorobutane, 1,1,1,2,2,3,3,4,4-nonafluorobutane, 1,1,1,2,3,4,4,4-octafluorobutane, 1,1,1,2,2,3,3-heptafluorobutane, 1,1,1,3,3-pentafluorobutane, perfluorohexane (tetradecafluorohexane), and the like, as well as combinations thereof.

In an aspect, the halogenated hydrocarbon compound can comprise hexachlorobenzene, hexafluorobenzene, carbon tetrachloride, carbontetrafluoride, heptafluoropropane, decafluorobutane, hexafluoroethane, perfluorohexane, or any combination thereof.

Moreover, in other aspects, the halogenated hydrocarbon compound can comprise a chlorine/fluorine-containing compound (or chlorofluorocarbon). While not limited thereto, suitable compounds can include $CF_3Cl$, $CF_2Cl_2$, $CFCl_3$, $CHFCl_2$, $CHF_2Cl$, $C_2F_2Cl_4$, $C_2F_4Cl_2$, and the like, or any combination thereof.

It can be beneficial, in aspects of this invention, for the halogenated hydrocarbon compound to have a boiling point (at standard temperature and pressure) within certain ranges. For instance, the halogenated hydrocarbon compound can have a boiling point of at least 25° C., such as, for example, a boiling point of at least 35° C., a boiling point of at least 45° C., or a boiling point of at least 55° C. Halogenated hydrocarbon compounds having boiling points of at least 110° C., or at least 125° C., can be employed as well. Yet, in another aspect, the halogenated hydrocarbon compound can have a boiling point in the 25° C. to 100° C. range; alternatively, a boiling point in the 35° C. to 95° C. range; alternatively, a boiling point in the 40° C. to 90° C. range; alternatively, a boiling point in the 110° C. to 250° C. range; alternatively, a boiling point in the 110° C. to 200° C. range; or alternatively, a boiling point in the 115° C. to 180° C. range.

Additionally or alternatively, it can be beneficial, in aspects of this invention, for the halogenated hydrocarbon compound to be a liquid under the polymerization conditions used in a polymerization reactor or in a polymerization reactor system. For instance, the halogenated hydrocarbon compound can be a liquid at a pressure ranging from 200 psig (1.38 MPa) to 1000 psig (6.89 MPa), or from 200 psig (1.38 MPa) to 700 psig (4.83 MPa). Specifically, but not limited thereto, the halogenated hydrocarbon compound can be a liquid at a temperature in the 60° C. to 130° C. range and a pressure of 500 psig (3.45 MPa); alternatively, a liquid in the 60° C. to 120° C. range and a pressure of 500 psig (3.45 MPa); alternatively, a liquid in the 60° C. to 95° C. range and a pressure of 500 psig (3.45 MPa); or alternatively, a liquid in the 70° C. to 110° C. range and a pressure of 500 psig (3.45 MPa)

The halogenated hydrocarbon compound also can be miscible with or soluble in a hydrocarbon solvent. For instance, the halogenated hydrocarbon compound can be miscible with or soluble in a hydrocarbon solvent comprising (or consisting essentially of, or consisting of) a $C_3$ to $C_{10}$ hydrocarbon; alternatively, a $C_3$ to $C_{10}$ aliphatic hydrocarbon; alternatively, a $C_3$ to $C_8$ aliphatic hydrocarbon; or alternatively, a $C_4$ to $C_8$ aliphatic hydrocarbon. The aliphatic hydrocarbon can be cyclic or acyclic, and can be linear or branched, unless otherwise specified. Illustrative aliphatic hydrocarbon solvents can include, but are not limited to, propane, isobutane, n-butane, n-pentane, isopentane, neopentane, n-hexane, heptane, octane, cyclohexane, cycloheptane, methylcyclohexane, methylcycloheptane, and the like, including mixtures or combinations thereof.

Furthermore, the halogenated hydrocarbon compound can be miscible with or soluble in a hydrocarbon solvent comprising (or consisting essentially of, or consisting of) a $C_6$ to $C_{10}$ aromatic hydrocarbon or, alternatively, a $C_6$ to $C_8$ aromatic hydrocarbon. Illustrative aromatic hydrocarbon solvents can include, but are not limited to, benzene, toluene, xylene, ethylbenzene, and the like, including mixtures or combinations thereof.

In one aspect, the halogenated hydrocarbon compound can be miscible with or soluble in propane, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, or a mixture thereof. In another aspect, the halogenated hydrocarbon compound can be miscible with or soluble in propane, cyclohexane, isobutane, n-butane, n-pentane, isopentane, neopentane, n-hexane, or a mixture thereof. In yet another aspect, the halogenated hydrocarbon compound can be miscible with or soluble in propane; alternatively, isobutane; alternatively, n-butane; alternatively, n-pentane; alternatively, isopentane; alternatively, neopentane; alternatively, n-hexane; alternatively, heptane; alternatively, octane; alternatively, cyclohexane; alternatively, cycloheptane; alternatively, methylcyclohexane; alternatively, methylcycloheptane; alternatively, benzene; alternatively, toluene; alternatively, xylene; or alternatively, ethylbenzene.

It is also contemplated that the halogenated hydrocarbon compound can be miscible with or soluble in an ISOPAR® mixed aliphatic hydrocarbon solvent, such as, for example, ISOPAR® C, ISOPAR® E, ISOPAR® G, ISOPAR® H, ISOPAR® L, ISOPAR® M, or any mixture or combination thereof. These materials are available from ExxonMobil.

Catalyst Systems

The methods and processes disclosed herein are applicable to any catalyst system (e.g., any transition metal-based catalyst system) suitable for the polymerization of an olefin monomer, but are not limited thereto. The catalyst system can comprise, for example, a transition metal (one or more than one) from Groups 3-10 of the Periodic Table of the Elements. In one aspect, the catalyst system can comprise a Group 4, 5, or 6 transition metal, or a combination of two or more transition metals. The catalyst system can comprise chromium, titanium, zirconium, hafnium, vanadium, or a combination thereof, in some aspects, or can comprise chromium, titanium, zirconium, hafnium, or a combination thereof, in other aspects. Accordingly, the catalyst system can comprise chromium, or titanium, or zirconium, or hafnium, either singly or in combination. Thus, catalyst systems comprising two or more transition metal compounds, wherein each transition metal compound independently can comprise chromium, titanium, zirconium, hafnium, vanadium, or a combination thereof, are contemplated and encompassed herein.

Various catalyst systems known to a skilled artisan are useful in the polymerization of olefins. These include, but are not limited to, Ziegler-Natta based catalyst systems, chromium-based catalyst systems, metallocene-based catalyst systems, and the like, including combinations thereof. The polymerization processes and reactor systems disclosed herein are not limited to the aforementioned catalyst systems, but nevertheless, particular aspects directed to these catalyst systems are contemplated. Hence, the catalyst system can be a Ziegler-Natta based catalyst system, a chromium-based catalyst system, and/or a metallocene-based catalyst system; alternatively, a Ziegler-Natta based catalyst system; alternatively, a chromium-based catalyst system; or alternatively, a metallocene-based catalyst system. In one aspect, the catalyst system can be a dual catalyst system comprising at least one metallocene compound, while in another aspect, the catalyst system can be a dual catalyst system comprising two different metallocene compounds.

Examples of representative and non-limiting catalyst systems include those disclosed in U.S. Pat. Nos. 3,887,494, 3,119,569, 4,053,436, 4,981,831, 4,364,842, 4,444,965, 4,364,855, 4,504,638, 4,364,854, 4,444,964, 4,444,962, 3,976,632, 4,248,735, 4,297,460, 4,397,766, 2,825,721, 3,225,023, 3,226,205, 3,622,521, 3,625,864, 3,900,457, 4,301,034, 4,547,557, 4,339,559, 4,806,513, 5,037,911, 5,219,817, 5,221,654, 4,081,407, 4,296,001, 4,392,990, 4,405,501, 4,151,122, 4,247,421, 4,397,769, 4,460,756, 4,182,815, 4,735,931, 4,820,785, 4,988,657, 5,436,305, 5,610,247, 5,627,247, 3,242,099, 4,808,561, 5,275,992, 5,237,025, 5,244,990, 5,179,178, 4,855,271, 4,939,217, 5,210,352, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,705,478, 5,631,203, 5,654,454, 5,705,579, 5,668,230, 6,300,271, 6,831,141, 6,653,416, 6,613,712, 7,294,599, 6,355,594, 6,395,666, 6,833,338, 7,417,097, 6,548,442, 7,312,283, 7,026,494, 7,041,617, 7,199,073, 7,226,886, 7,517,939, 7,619,047, 7,919,639, and 8,080,681, each of which is incorporated herein by reference in its entirety.

In some aspects, the catalyst system, in addition to a transition metal compound, can contain an activator and an optional co-catalyst. Illustrative activators can include, but are not limited to, aluminoxane compounds, organoboron or organoborate compounds, ionizing ionic compounds, activator-supports (e.g., solid oxides treated with an electron-withdrawing anion), and the like, or combinations thereof. Commonly used polymerization co-catalysts can include, but are not limited to, metal alkyl, or organometal, co-catalysts, with the metal encompassing boron, aluminum, and the like. For instance, alkyl boron and/or alkyl aluminum compounds often can be used as co-catalysts in a transition metal-based catalyst system. Representative compounds can include, but are not limited to, tri-n-butyl borane, tripropylborane, triethylborane, trimethylaluminum (TMA), triethylaluminum (TEA), tri-n-propylaluminum (TNPA), trin-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, including combinations thereof. In these and other aspects, the transition metal compound can comprise a metallocene compound and/or a chromium compound. The metallocene compound can be a bridged metallocene or an unbridged metallocene compound.

In some aspects, the transition metal-based catalyst system can comprise (or consist essentially of, or consist of) a transition metal supported on, impregnated onto, and/or mixed or cogelled with a carrier. The transition metal compound, whether a metallocene compound, chromium compound, or other, can be supported on, impregnated onto, and/or mixed or cogelled with any of a number of porous carriers including, but not limited to, solid oxides, activator-supports (chemically-treated solid oxides), molecular sieves and zeolites, clays and pillared clays, and the like. For example, the transition metal-based catalyst system can comprise chromium impregnated onto silica, chromium impregnated onto silica-titania, chromium impregnated onto aluminophosphate, chromium cogelled with silica, chromium cogelled with silica-titania, or chromium cogelled with aluminophosphate, and this includes any combinations of these materials.

In some aspects, the catalyst system can comprise a metallocene catalyst component, while in other aspects, the catalyst system can comprise a first metallocene catalyst component and a second metallocene catalyst component. The catalyst systems can contain an activator and, optionally, a co-catalyst. Any metallocene component of the catalyst systems provided herein can, in some aspects, comprise an unbridged metallocene; alternatively, an unbridged zirconium or hafnium based metallocene compound; alternatively, an unbridged zirconium or hafnium based metallocene compound containing two cyclopentadienyl groups, two indenyl groups, or a cyclopentadienyl and an indenyl group; alternatively, an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems consistent with aspects of the present invention are described in U.S. Pat. Nos. 7,199,073, 7,226,886, 7,312,283, and 7,619,047, the disclosures of which are incorporated herein by reference in their entirety.

In other aspects, any metallocene component of the catalyst systems provided herein can comprise a bridged metallocene compound, e.g., with titanium, zirconium, or hafnium, such as a bridged zirconium based metallocene compound with a fluorenyl group, and with no aryl groups on the bridging group, or a bridged zirconium based metallocene compound with a cyclopentadienyl group and a fluorenyl group, and with no aryl groups on the bridging group. Such bridged metallocenes, in some aspects, can contain an alkenyl substituent (e.g., a terminal alkenyl) on the bridging group, on a cyclopentadienyl-type group (e.g., a cyclopentadienyl group or a fluorenyl group), or on the bridging group and the cyclopentadienyl-type group. In another aspect, the metallocene catalyst component can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other aspects, the aryl group on the bridging group can be a phenyl group. Optionally, these bridged metallocenes can contain an alkenyl substituent (e.g., a terminal alkenyl) on the bridging group, on a cyclopentadienyl-type group, or on both the bridging group and the cyclopentadienyl group. Illustrative and non-limiting examples of bridged metallocene compounds (e.g., with zirconium or hafnium) that can be employed in catalyst systems consistent with aspects of the present invention are described in U.S. Pat. Nos. 7,026,494, 7,041,617, 7,226,886, 7,312,283, 7,517,939, and 7,619,047, the disclosures of which are incorporated herein by reference in their entirety.

Solid Oxides

In some aspects, the transition metal-based catalyst system can contain a solid oxide. Generally, the solid oxide can comprise oxygen and one or more elements selected from Group 2, 3, 4, 5, 6, 7, 8, 9, 10, 11, 12, 13, 14, or 15 of the periodic table, or comprise oxygen and one or more elements selected from the lanthanide or actinide elements (See: *Hawley's Condensed Chemical Dictionary*, 11$^{th}$ Ed., John Wiley & Sons, 1995; Cotton, F. A., Wilkinson, G., Murillo, C. A., and Bochmann, M., *Advanced Inorganic Chemistry*, 6$^{th}$ Ed., Wiley-Interscience, 1999). For example, the solid inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used as components of a catalyst system can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof.

The solid oxide can encompass oxide materials such as alumina, "mixed oxide" compounds thereof such as silica-alumina, and combinations or mixtures of more than one solid oxide material. Mixed oxides such as silica-alumina can be single or multiple chemical phases with more than one metal combined with oxygen to form the solid oxide. Examples of mixed oxides that can be used herein include, but are not limited to, silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, and the like, or a combination thereof. Silica-coated aluminas are encompassed herein; such oxide materials are described in, for example, U.S. Pat. No. 7,884,163, the disclosure of which is incorporated herein by reference in its entirety.

The percentage of each oxide in a mixed oxide can vary depending upon the respective oxide materials. As an example, a silica-alumina typically has an alumina content from 5% to 95% by weight. According to one aspect, the alumina content of the silica-alumina can be from 5% to 50% alumina by weight, or from 8% to 30% alumina by weight. In another aspect, high alumina content silica-alumina compounds can be employed, in which the alumina content of these silica-alumina materials typically ranges from 60% to 90% alumina by weight, or from 65% to 80% alumina by weight.

In one aspect, the solid oxide can comprise silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, or a combination thereof; alternatively, silica-alumina; alternatively, silica-coated alumina; alternatively, silica-titania; alternatively, silica-zirconia; alternatively, alumina-titania; alternatively, alumina-zirconia; alternatively, zinc-aluminate; alternatively, alumina-boria; alternatively, silica-boria; alternatively, aluminum phosphate; alternatively, aluminophosphate; alternatively, aluminophosphate-silica; or alternatively, titania-zirconia.

In another aspect, the solid oxide can comprise silica, alumina, titania, zirconia, magnesia, boria, zinc oxide, a mixed oxide thereof, or any mixture thereof. For instance, the solid oxide can comprise silica, alumina, titania, or a combination thereof alternatively, silica; alternatively, alumina; alternatively, titania; alternatively, zirconia; alternatively, magnesia; alternatively, boria; or alternatively, zinc oxide.

In some aspects, the solid oxide can have a pore volume greater than 0.1 cc/g, or alternatively, greater than 0.5 cc/g. Often, the solid oxide can have a pore volume greater than 1.0 cc/g. Additionally, or alternatively, the solid oxide can have a surface area greater than 100 $m^2/g$; alternatively, greater than 250 $m^2/g$; or alternatively, greater than 350 $m^2/g$. For example, the solid oxide can have a surface area of from 100 $m^2/g$ to 1000 $m^2/g$, from 200 $m^2/g$ to 800 $m^2/g$, or from 250 $m^2/g$ to 600 $m^2/g$.

Activator-Supports

The present invention encompasses various transition metal-based catalyst systems which can contain an activator-support. In one aspect, the activator-support can comprise a solid oxide treated with an electron-withdrawing anion. Alternatively, in another aspect, the activator-support can comprise a solid oxide treated with an electron-withdrawing anion, the solid oxide containing a Lewis-acidic metal ion. Non-limiting examples of suitable activator-supports are disclosed in, for instance, U.S. Pat. Nos. 7,294,599, 7,601,665, 7,884,163, 8,309,485, 8,623,973, 8,703,886, and 9,023,959, which are incorporated herein by reference in their entirety.

The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163 (e.g., Sasol Siral® 28 and Sasol Siral® 40).

Accordingly, in one aspect, the solid oxide can comprise silica, alumina, silica-alumina, silica-coated alumina, aluminum phosphate, aluminophosphate, heteropolytungstate, titania, silica-titania, zirconia, silica-zirconia, magnesia, boria, zinc oxide, any mixed oxide thereof, or any combination thereof. In another aspect, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another aspect, the solid oxide can comprise silica, alumina, titania, zirconia, magnesia, boria, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have an silica content from about 5 to about 95% by weight. In one aspect, the silica content of these solid oxides can be from about 10% to about 80% silica by weight, or from about 20% to about 70% silica by weight. In another aspect, such materials can have silica contents ranging from about 15% to about 60% silica by weight, or from about 25% to about 45% silica by weight. The solid oxides contemplated herein can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The activator-support generally can contain from about 1 wt. % to about 25 wt. % of the electron-withdrawing anion, based on the weight of the activator-support. In particular aspects provided herein, the activator-support can contain from about 1 wt. % to about 20 wt. %, from about 2 wt. % to about 20 wt. %, from about 3 wt. % to about 20 wt. %, from about 2 wt. % to about 15 wt. %, from about 3 wt. % to about 15 wt. %, from about 3 wt. % to about 12 wt. %, or from about 4 wt. % to about 10 wt. %, of the electron-withdrawing anion, based on the total weight of the activator-support.

In an aspect, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, and the like, as well as any mixture or combination thereof. In another aspect, the activator-support employed in the catalyst systems described herein can be, or can comprise, a fluorided solid oxide and/or a sulfated solid oxide, non-limiting examples of which can include fluorided alumina, sulfated alumina, fluorided silica-alumina, sulfated silica-alumina, fluorided silica-zirconia, fluorided silica-coated alumina, sulfated silica-coated alumina, and the like, as well as combinations thereof. In yet another aspect, the activator-support can comprise fluorided alumina; alternatively, chlorided alumina; alternatively, sulfated alumina; alternatively, fluorided silica-alumina; alternatively, sulfated silica-alumina; alternatively, fluorided silica-zirconia; alternatively, chlorided silica-zirconia; alternatively, sulfated silica-coated alumina; alternatively, fluorided-chlorided silica-coated alumina; or alternatively, fluorided silica-coated alumina. In some aspects, the activator-support can comprise a fluorided solid oxide, while in other aspects, the activator-support can comprise a sulfated solid oxide.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, or phosphated solid oxides) are well known to those of skill in the art.

Olefin Monomers and Olefin Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization and terpolymerization reactions using an olefin monomer with at least one different olefinic compound. As previously disclosed, polymerization processes are meant to encompass oligomerization processes as well.

As an example, any resultant ethylene copolymers and terpolymers generally can contain a major amount of ethylene (>50 mole percent) and a minor amount of comonomer (<50 mole percent). Comonomers that can be copolymerized with ethylene often have from 3 to 20 carbon atoms, or from 3 to 8 carbon atoms, in their molecular chain.

Acyclic, cyclic, polycyclic, terminal (α), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an aspect, the olefin monomer can comprise a $C_2$-$C_{24}$ olefin; alternatively, a $C_2$-$C_{12}$ olefin; alternatively, a $C_6$-$C_{24}$ olefin; alternatively, a $C_2$-$C_{10}$ α-olefin; alternatively, propylene, 1-butene, 1-pentene, 1-hexene, 1-heptene, 1-octene, 1-decene, or styrene; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can comprise, for example, ethylene or propylene, which is copolymerized with at least one comonomer. According to one aspect, the olefin monomer in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect, the olefin monomer can comprise ethylene and the olefin comonomer can comprise an α-olefin (e.g., a $C_3$-$C_{10}$ α-olefin), while in yet another aspect, the comonomer can comprise propylene, 1-butene, 1-pentene, 1-hexene, 1-octene, 1-decene, styrene, or any combination thereof; or alternatively, the olefin comonomer can comprise 1-butene, 1-hexene, 1-octene, or a combination thereof.

Generally, the amount of comonomer introduced into a polymerization reactor to produce the copolymer can be from about 0.01 weight percent to about 50 weight percent of the comonomer based on the total weight of the monomer and comonomer. According to another aspect, the amount of comonomer introduced into a polymerization reactor can be from about 0.01 weight percent to about 40 weight percent comonomer based on the total weight of the monomer and comonomer. In still another aspect, the amount of comonomer introduced into a polymerization reactor can be from about 0.1 weight percent to about 35 weight percent comonomer based on the total weight of the monomer and comonomer. Yet, in another aspect, the amount of comonomer introduced into a polymerization reactor can be from about 0.5 weight percent to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/1-butene, ethylene/1-hexene, or ethylene/1-octene), a propylene random copolymer, a propylene block copolymer, and the like, including combinations thereof. In one aspect, the olefin polymer can have a bimodal molecular weight distribution, while in another aspect, the olefin polymer can have a multimodal molecular weight distribution. In yet another aspect, the olefin polymer can have a unimodal molecular weight distribution.

Moreover, the olefin polymer (or oligomer) can comprise, in certain aspects, an olefin dimer, olefin trimer, or olefin tetramer, and including mixtures or combinations thereof. Thus, olefin polymer encompasses oligomerization products of $C_6$-$C_{24}$ olefins (or $C_6$-$C_{24}$ α-olefins, or 1-hexene, or 1-octene, or 1-decene, or 1-dodecene, or 1-tetradecene, or 1-hexadecene).

Polymerization Reactor Systems

The disclosed methods and processes are intended for any olefin polymerization process using various types of polymerization reactors, polymerization reactor systems, and polymerization reaction conditions. As used herein, "polymerization reactor" includes any polymerization reactor capable of polymerizing olefin monomers and comonomers (one or more than one comonomer) to produce homopolymers, copolymers, terpolymers, and the like. The various types of polymerization reactors include, but are not limited to, those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave reactors, tubular reactors, or combinations thereof, in parallel or in series. Reactor types can include batch or continuous processes. Continuous processes can use intermittent or continuous product discharge. Polymerization reactor systems and processes also can include partial or full direct recycle of unreacted monomer, unreacted comonomer (if used), or diluent (if used).

A polymerization reactor system can comprise a single reactor or multiple reactors (for example, 2 reactors, or more than 2 reactors) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by at least one transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop or gas phase reactors. The multiple reactors can be operated in series, in parallel, or both. For instance, a representative reactor system can include a loop reactor (one or more) in series with a gas phase reactor (one or more).

According to one aspect, the polymerization reactor system can comprise at least one loop slurry reactor comprising vertical or horizontal loops. Monomer, diluent (if used), catalyst, and comonomer (if used) can be continuously fed to a loop reactor where polymerization occurs. Generally, continuous processes can comprise the continuous introduction of monomer (and comonomer, if used), catalyst, and diluent into a polymerization reactor and the continuous removal from this reactor of a suspension comprising polymer particles and the diluent. In some aspects, the wt. % solids (based on reactor contents) in the loop reactor often can range from about 30 wt. % to about 55 wt. %, or from about 40 wt. % to about 70 wt. %. In other aspects, the wt. % solids in the loop reactor can be less than about 50 wt. %, less than about 40 wt. %, or less than about 30 wt. %, such as from about 25 wt. % to about 45 wt. %, or from about 30 wt. % to about 40 wt. %. Reactor effluent can be flashed to remove the solid polymer from the liquids that comprise the diluent, monomer, or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used, such as can be employed in the bulk polymerization of propylene to form polypropylene homopolymers.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously or pulsed) or as described herein.

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer. A suitable polymerization temperature can be any temperature below the de-polymerization temperature according to the Gibbs Free energy equation. Typically, this includes from about 25° C. to about 280° C., for example, or from about 25° C. to about 175° C., depending upon the type of polymerization reactor. In some reactor systems, the polymerization temperature generally can be within a range from about 60° C. to about 120° C., or from about 60° C. to about 95° C.

Suitable pressures will also vary according to the reactor and polymerization type. The pressure for liquid phase polymerizations in a loop reactor typically can be less than 1000 psig (6.89 MPa). The pressure for gas phase polymerization can be in the 200 psig (1.38 MPa) to 500 psig (3.45 MPa) range. High pressure polymerization in tubular or autoclave reactors generally can be conducted at about 20,000 psig (137.9 MPa) to 75,000 psig (517.1 MPa). Polymerization reactors also can be operated in a supercritical region occurring at generally higher temperatures and pressures (for instance, above 92° C. and 700 psig (4.83 MPa)). Operation above the critical point of a pressure/temperature diagram (supercritical phase) can offer advantages to the polymerization reaction process.

This invention is also directed to, and encompasses, the olefin polymers produced by any of the polymerization processes disclosed herein. Articles of manufacture can be formed from, or can comprise, the olefin polymers (e.g., ethylene homopolymers or ethylene copolymers) produced in accordance with this invention.

EXAMPLES

Aspects of the invention are further illustrated by the following examples, which are not to be construed in any way as imposing limitations to the scope of this invention described herein. Various other aspects, modifications, and equivalents thereof which, after reading the description herein, may suggest themselves to one of ordinary skill in the art without departing from the spirit of the present invention or the scope of the appended claims.

Melt index (MI, g/10 min) can be determined in accordance with ASTM D1238 at 190° C. with a 2,160 gram weight. Polymer density was determined in grams per cubic centimeter ($g/cm^3$) on a compression molded sample, cooled at about 15° C. per hour, and conditioned for about 40 hours at room temperature in accordance with ASTM D1505 and ASTM D4703.

Molecular weights and molecular weight distribution curves were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 400 μL was used. The integral calibration method was used to deduce molecular weights and molecular weight distributions using a Chevron Phillips Chemical Company's HDPE polyethylene resin, MARLEX® BHB5003, as the broad standard. The integral table of the standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve).

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity $|\eta^*|$ versus frequency (ω) data were then curve fitted using the modified three parameter Carreau-Yasuda (CY) empirical model to obtain the zero-shear viscosity—$\eta_0$, characteristic viscous relaxation time—$\tau_\eta$, and the breadth parameter—a. The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein:
$|\eta^*(\omega)|$=magnitude of complex shear viscosity;
$\eta_0$=zero-shear viscosity;
$\tau_\eta$=viscous relaxation time;
a="breadth" parameter (CY-a parameter);
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics,* 2nd Edition, John Wiley & Sons (1987); each of which is incorporated herein by reference in its entirety.

Sulfated alumina activator-supports were prepared as follows. Bohemite was obtained from W.R. Grace & Company under the designation "Alumina A" and having a surface area of about 300 m²/g and a pore volume of about 1.3 mL/g. This material was obtained as a powder having an average particle size of about 100 microns. This material was impregnated to incipient wetness with an aqueous solution of ammonium sulfate to equal about 15% sulfate. This mixture was then placed in a flat pan and allowed to dry under vacuum at approximately 110° C. for about 16 hours. To calcine the resultant powdered mixture, the material was fluidized in a stream of dry air at about 550° C. for about 6 hours. Afterward, the sulfated alumina ("SA") was collected and stored under dry nitrogen, and was used without exposure to the atmosphere.

Fluorided silica-coated alumina activator-supports were prepared as follows. The same alumina noted above was first calcined in dry air at about 600° C. for approximately 6 hours, cooled to ambient temperature, and then contacted with tetraethylorthosilicate in isopropanol to equal 25 wt. % SiO₂. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina ("FSCA") was collected and stored under dry nitrogen, and was used without exposure to the atmosphere.

Examples 1-11

Impact of the Addition of Hexafluorobenzene on a Polymerization Reaction Using a Single Metallocene Based Catalyst System The polymerization experiments of Examples 1-11 were conducted for 30 minutes or 1 hour in a one-gallon (3.8-L) stainless steel autoclave reactor containing 2 L of isobutane as diluent, and hydrogen (when used) was added with the ethylene and measured on a ppm weight basis of the ethylene feed. Metallocene solutions (nominal 1 mg/mL) of MET-1 and MET-2 were prepared by dissolving 15 mg of the respective metallocene in 15 mL of toluene. Metallocene compounds MET-1 and MET-2 had the following structures (t-Bu=tert-butyl; Me=methyl):

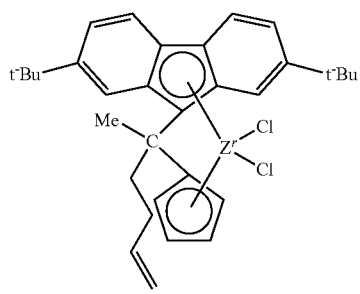

MET-1

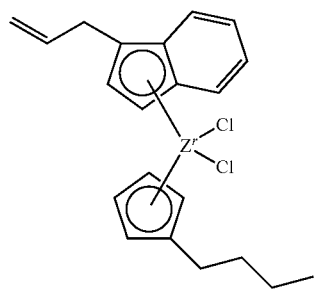

MET-2

The polymerization experiments were performed as follows. Under isobutane vapor purge, a triisobutylaluminum (TIBA) solution (1.0 mL, 25% in heptanes) was charged to a cold reactor followed by sulfated alumina (100 mg) and the respective metallocene solution (1 mg of the metallocene compound), and then hexafluorobenzene (HFB), when used. The reactor was closed, and 2 L of isobutane were added. The halogenated hydrocarbon compound was used at approximately 5-150 ppm by weight of the reactor contents, and the weight ratio of the halogenated hydrocarbon compound to the weight of the catalyst system ranged from approximately 0.1:1 to 5:1 for metallocene and chromium catalyst systems (and from approximately 1:1 to 100:1 for Ziegler-Natta catalyst systems). The reactor was quickly heated to within 5 degrees of the target reaction temperature, and the ethylene (with or without hydrogen) feed was opened. Ethylene was fed on demand to maintain the target reactor pressure, and the reactor was maintained at the desired reaction temperature throughout the experiment by an automated heating-cooling system. For copolymerization experiments, 1-hexene was flushed in with the initial ethylene charge. At the end of each polymerization experiment, the polymer produced was dried overnight at 60° C. under vacuum.

Table I summarizes the amount of hexafluorobenzene (HFB) added, the productivity (grams of polymer produced per gram of catalyst system), and certain polymerization reaction conditions for Examples 1-11. As shown in Table I, and unexpectedly, the addition of HFB significantly increased the productivity, regardless of the metallocene compound used, the presence or absence of hydrogen, the polymerization reaction conditions used (e.g., pressure and temperature), and whether a homopolymer or copolymer was produced. Table I demonstrates increases in productivity ranging from 40% to 180%.

Figure 2:
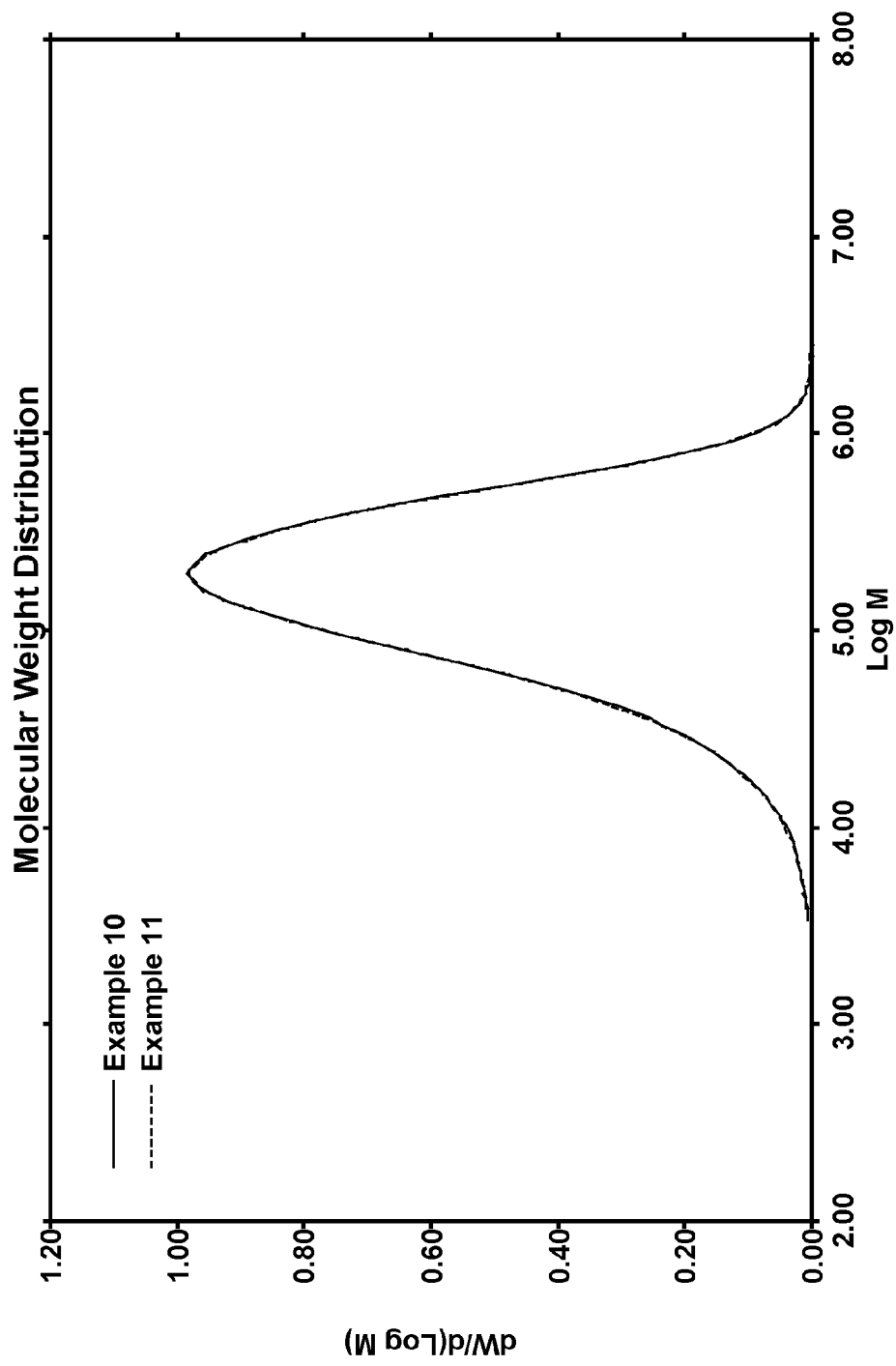
FIG. 2 presents a plot of the molecular weight distributions of the polymers of Examples 10-11, produced with a metallocene-based catalyst system.

Table II summarizes the properties of the polymers produced in Examples 1-11. As shown in Table II, and unexpectedly, the addition of HFB typically decreased the molecular weight of the polymer, with general trends toward a decrease in the Mw and a decrease in the zero-shear viscosity of the polymer. FIG. 1 and FIG. 2 are molecular weight distribution curves (amount of polymer versus logarithm of molecular weight) for the polymers of Examples 7-8 and Examples 10-11, respectively. The shapes of the molecular weight distribution curves were not significantly impacted by the addition of HFB.

Examples 12-22

Impact of the Addition of Hexafluorobenzene on a Polymerization Reaction Using a Dual Metallocene Based Catalyst System.

The polymerization experiments of Examples 12-22 were performed in substantially the same manner as those of Examples 1-11. The dual catalyst system contained MET-2 in combination with either MET-3 or MET-4 (Ph=phenyl; t-Bu=tert-butyl) at a 1:1 weight ratio (0.5 mg of each metallocene compound):

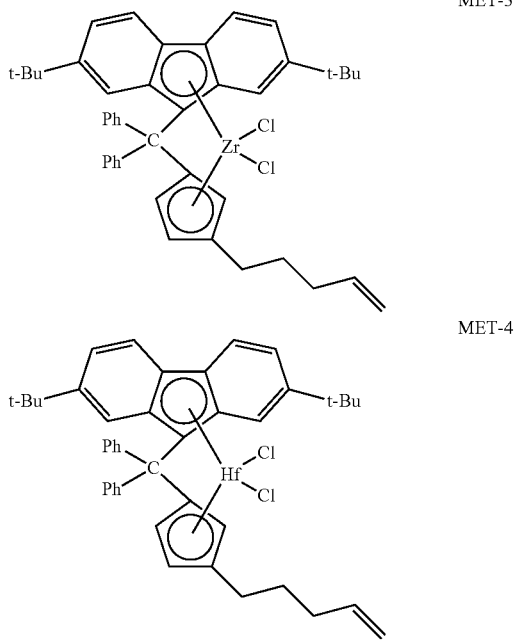

MET-3

MET-4

Table III summarizes the amount of hexafluorobenzene (HFB) added, the productivity (grams of polymer produced per gram of catalyst system), and certain polymerization reaction conditions for Examples 12-22. As shown in Table III, and unexpectedly, the addition of HFB generally increased the productivity, regardless of the dual metallocene compound system used, the presence or absence of hydrogen, the polymerization reaction conditions used (e.g., pressure and temperature), and whether a homopolymer or copolymer was produced. Table III demonstrates increases in productivity ranging from 10% to 160%.

Table IV summarizes the properties of the polymers produced in Examples 18-19. As shown in Table IV, and unexpectedly, the addition of HFB decreased the molecular weight of the polymer, with a decrease in the Mw and Mz of the polymer.

Examples 23-31

Impact of the Addition of Hexafluorobenzene on a Polymerization Reaction Using a Ziegler-Natta Based Catalyst System.

The polymerization experiments of Examples 23-31 were performed in substantially the same manner as those of Examples 1-11, with the Ziegler-Natta catalyst (5 mg) charged to the reactor instead of the metallocene compound. ZN-1 was not a pre-polymerized catalyst, and contained titanium compounds ($TiCl_3/TiCl_4$), $MgCl_2$, and aluminum compounds totaling greater than 80 wt. % of the catalyst. ZN-2 contained 14-19 wt. % titanium compounds ($TiCl_3/TiCl_4$), 17-24 wt. % $MgCl_2$, 9-13 wt. % aluminum compounds, 43-53 wt. % polyethylene, and less than 3 wt. % heptane. The overall metal concentration for Ti was in the 3.5-5.9 wt. % range, and for Mg was in the 4.1-5.8 wt. % range.

Table V summarizes the amount of hexafluorobenzene (HFB) added, the productivity (grams of polymer produced per gram of catalyst system), and certain polymerization reaction conditions for Examples 23-31. Hydrogen addition ($\Delta P$) in psig was based on the pressure drop of a 320 cc hydrogen vessel (at ambient temperature) connected to the reactor. As shown in Table V, and unexpectedly, the addition of HFB significantly increased the productivity, regardless of the Ziegler-Natta catalyst used, the presence or absence of hydrogen, the polymerization reaction conditions used (e.g., pressure and temperature), and whether a homopolymer or copolymer was produced. Table V demonstrates increases in productivity ranging from 25% to 60%.

Figure 3:
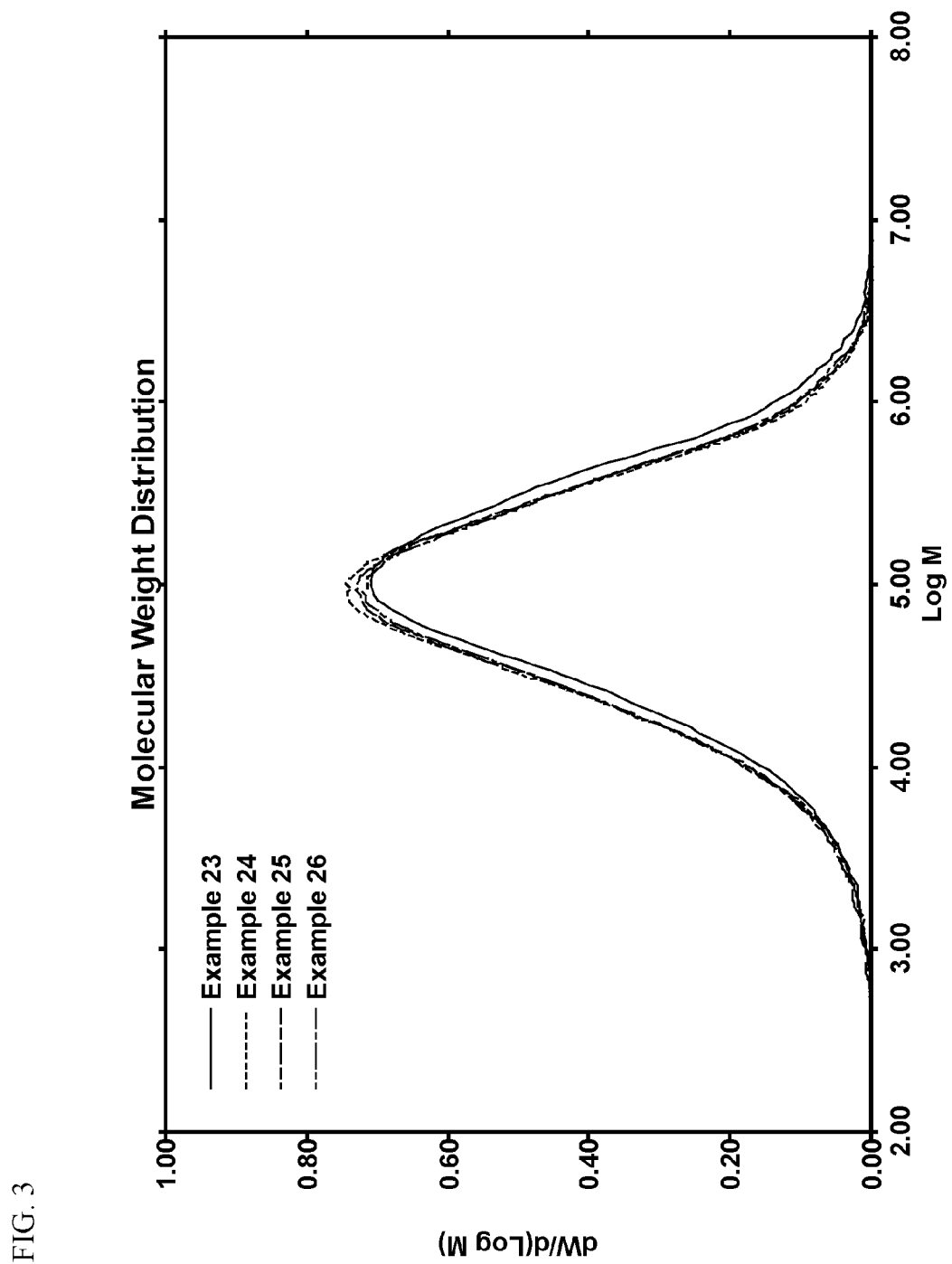
FIG. 3 presents a plot of the molecular weight distributions of the polymers of Examples 23-26, produced with a Ziegler-Natta based catalyst system.
Figure 4:
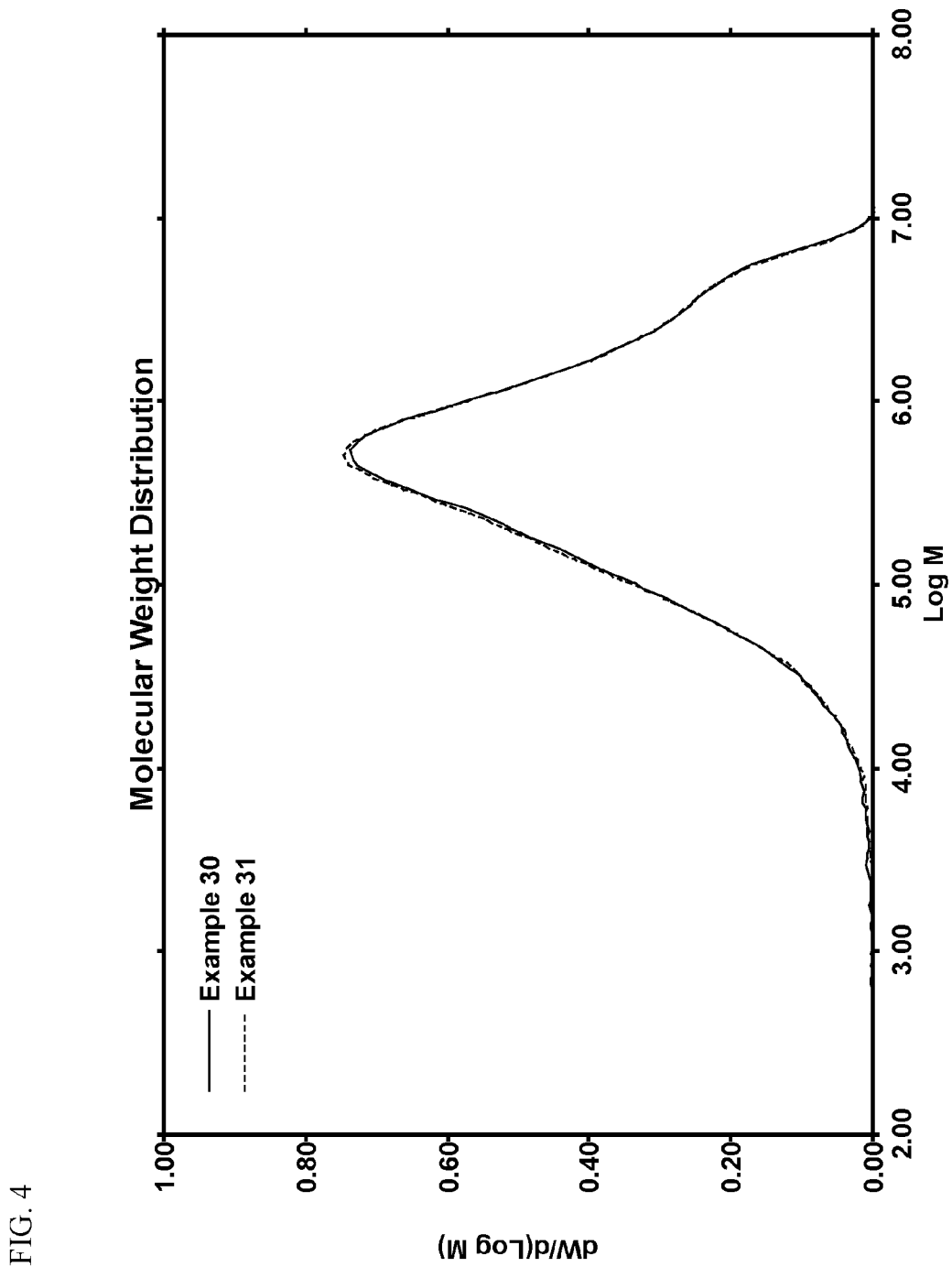
FIG. 4 presents a plot of the molecular weight distributions of the polymers of Examples 30-31, produced with a Ziegler-Natta based catalyst system.

Table VI summarizes the properties of the polymers produced in Examples 23-31. As shown in Table VI, and unexpectedly, the addition of HFB decreased the molecular weight of the polymer, with general trends toward a decrease in the Mw and a decrease in the zero-shear viscosity of the polymer. FIG. 3 and FIG. 4 are molecular weight distribution curves for the polymers of Examples 23-26 and Examples 30-31, respectively. The shapes of the molecular weight distribution curves were not significantly impacted by the addition of HFB.

Examples 32-36

Impact of the Addition of Hexafluorobenzene on a Polymerization Reaction Using a Chromium-Based Catalyst System.

The polymerization experiments of Examples 32-36 were performed in substantially the same manner as those of Examples 1-11, with the chromium catalyst charged to the reactor instead of the metallocene compound—i.e., 1 mg Cr (elemental basis), 100 mg sulfated alumina, and 1 mL TIBA solution.

Table VII summarizes the amount of hexafluorobenzene (HFB) added, the productivity (grams of polymer produced per gram of catalyst system), and certain polymerization reaction conditions for Examples 32-36. Hydrogen addition ($\Delta P$) in psig was based on the pressure drop of a 320 cc hydrogen vessel (at ambient temperature) connected to the reactor. As shown in Table VII, and unexpectedly, the addition of HFB significantly increased the productivity, regardless of the amount of hydrogen used, and whether a homopolymer or copolymer was produced. Table VII demonstrates increases in productivity ranging from 10% to 35%.

Figure 5:
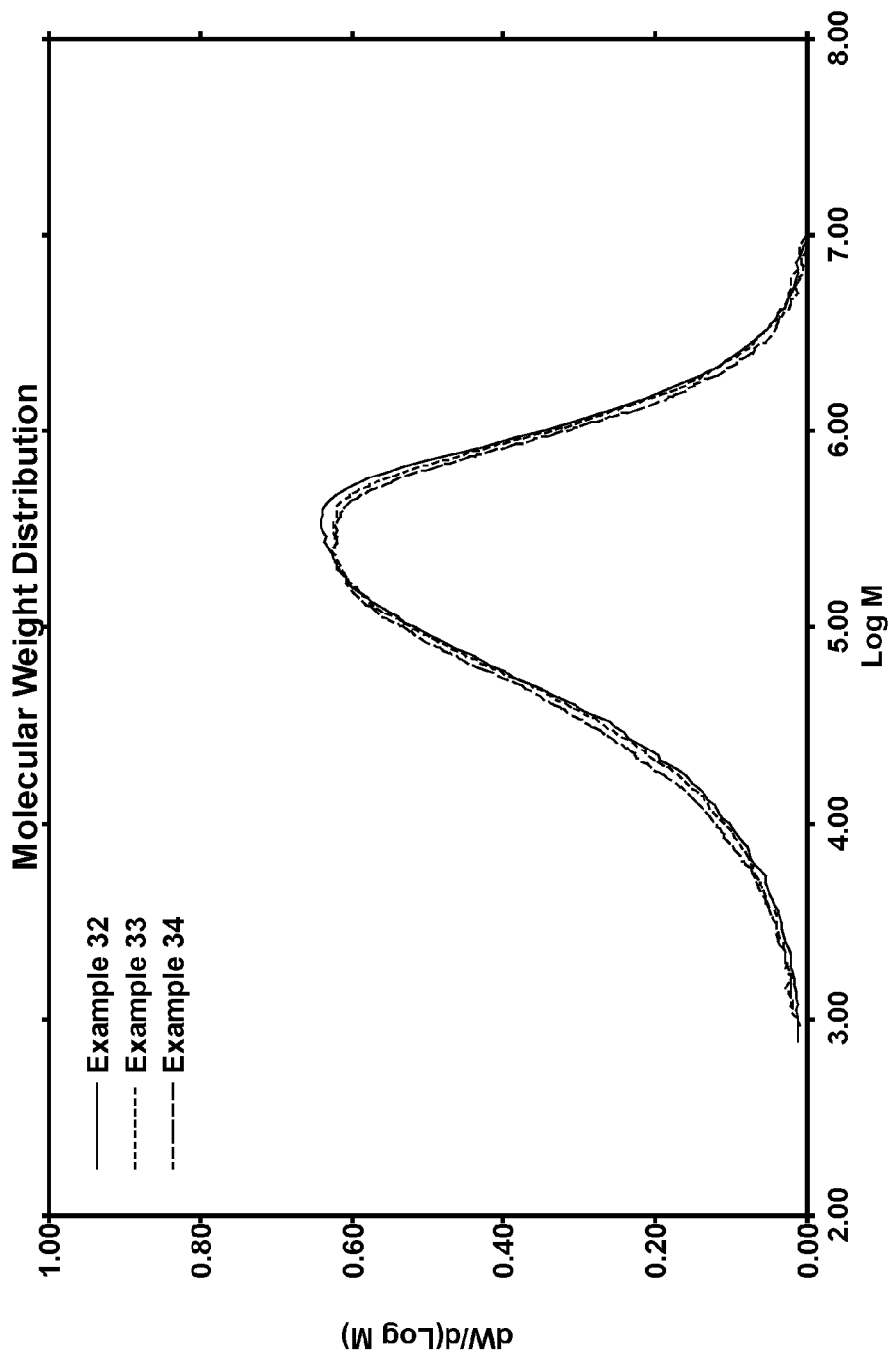
FIG. 5 presents a plot of the molecular weight distributions of the polymers of Examples 32-34, produced with a chromium-based catalyst system.
Figure 6:
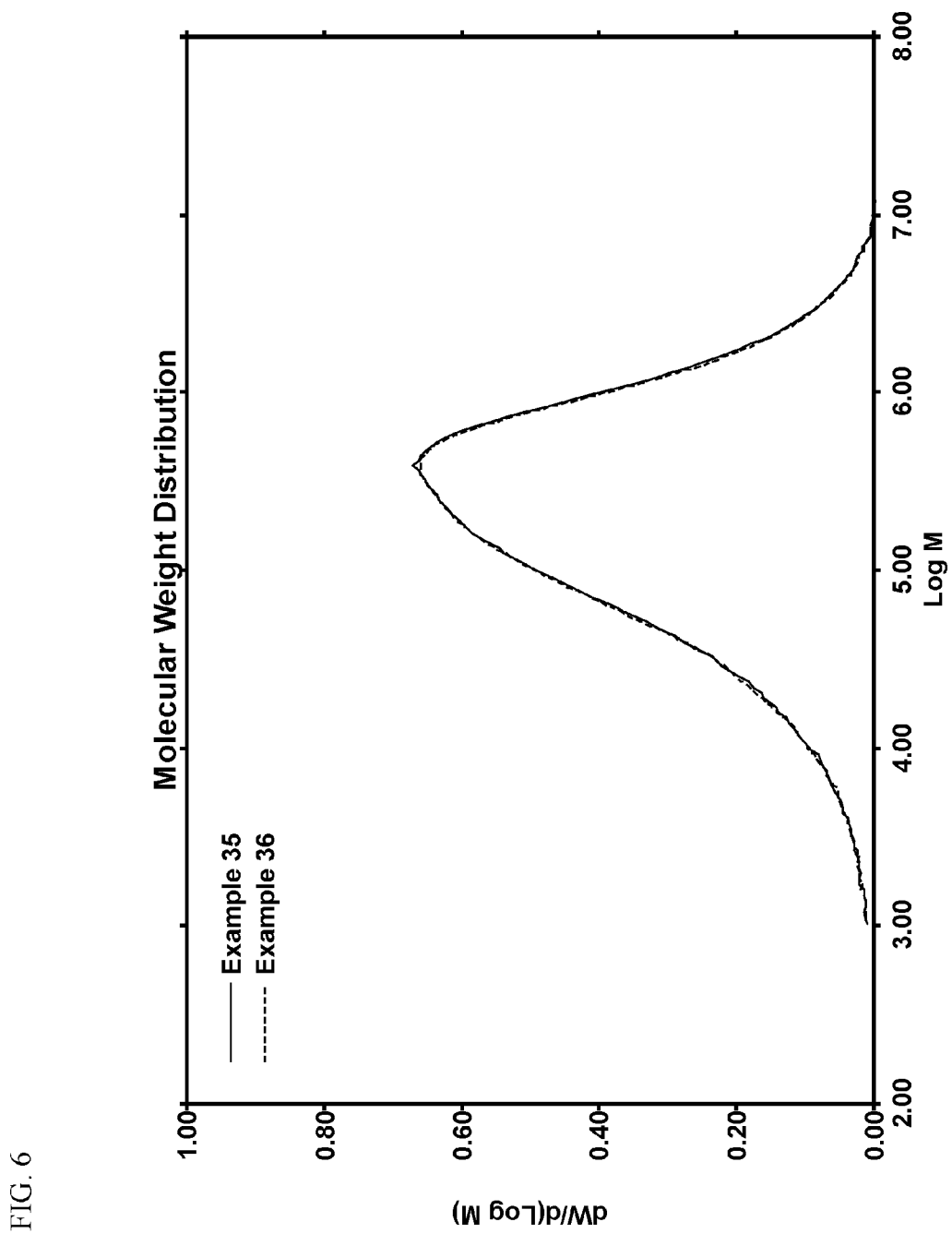
FIG. 6 presents a plot of the molecular weight distributions of the polymers of Examples 35-36, produced with a chromium-based catalyst system.

Table VIII summarizes the properties of the polymers produced in Examples 32-36. As shown in Table VIII, and unexpectedly, the addition of HFB typically decreased the molecular weight of the polymer, with general trends toward a decrease in the Mw and a decrease in the zero-shear viscosity of the polymer. FIG. 5 and FIG. 6 are molecular weight distribution curves (amount of polymer versus logarithm of molecular weight) for the polymers of Examples 32-34 and Examples 35-36, respectively. The shapes of the molecular weight distribution curves were not significantly impacted by the addition of HFB.

Examples 37-40

Performance Comparison of Halogenated Hydrocarbon and Non-Hydrocarbon Compounds in a Polymerization Reaction Using a Metallocene Based Catalyst System.

The polymerization experiments of Examples 37-40 were performed in substantially the same manner as those of Examples 1-11, with MET-5 (ethylene-bis-indenyl zirconium dichloride) charged to the reactor (1 mg), instead of MET-1 or MET-2, and with fluorided silica-coated alumina (FSCA, 100 mg) used as the activator-support instead of sulfated alumina (SA). No halogenated hydrocarbon compound was used in Example 37, hexafluorobenzene (HFB) was used in Example 38, perfluorohexane (PFH, also known as tetradecafluorohexane) was used in Example 39, and trimethyl(trifluoromethyl)silane (TFMTMS) was used in Example 40.

Table IX summarizes the amount of halogenated compound added, the productivity (grams of polymer produced per gram of catalyst system), and certain polymerization reaction conditions for Examples 37-40. As shown in Table IX, and unexpectedly, the addition of HFB or PFH significantly increased the productivity, with increases in productivity of almost 100%. In contrast, the addition of TFMTMS did not increase the productivity, but instead resulted in no polymer production. TFMTMS is not a halogenated hydrocarbon compound.

TABLE I

Examples 1-11 - Polymerization Conditions.

| Example | Metallocene Compound | 1-hexene (g) | HFB (mL) | $H_2$ (ppm) | Pressure (psig) | Temperature (° C.) | Productivity (g/g) |
|---|---|---|---|---|---|---|---|
| 1 | MET-1 | 0 | 0 | 0 | 320 | 80 | 2240 |
| 2 | MET-1 | 0 | 0.1 | 0 | 320 | 80 | 5050 |
| 3 | MET-1 | 0 | 0.3 | 0 | 320 | 80 | 3650 |
| 4 | MET-1 | 35 | 0 | 100 | 320 | 80 | 1370 |
| 5 | MET-1 | 35 | 0.05 | 100 | 320 | 80 | 3820 |
| 6 | MET-1 | 35 | 0.1 | 100 | 320 | 80 | 3580 |
| 7 | MET-1 | 20 | 0 | 0 | 320 | 80 | 2300 |
| 8 | MET-1 | 20 | 0.1 | 0 | 320 | 80 | 3280 |
| 9 | MET-1 | 20 | 0.3 | 0 | 320 | 80 | 3360 |
| 10 | MET-2 | 0 | 0 | 0 | 430 | 95 | 2060 |
| 11 | MET-2 | 0 | 0.1 | 0 | 430 | 95 | 2950 |

TABLE II

Examples 1-11 - Polymer Properties.

| Example | Mn/1000 (g/mol) | Mw/1000 (g/mol) | Mz/1000 (g/mol) | Mv/1000 (g/mol) | Mp/1000 (g/mol) | Mw/Mn | Mz/Mw | $\eta_0$ (Pa-sec) | Density (g/cc) |
|---|---|---|---|---|---|---|---|---|---|
| 1 | 73.0 | 317.8 | 738.4 | 278.0 | 257.8 | 4.4 | 2.3 | 1.80E+06 | — |
| 2 | 129.6 | 388.9 | 872.9 | 344.4 | 318.9 | 3.0 | 2.2 | 5.31E+05 | — |
| 3 | 101.6 | 381.1 | 910.3 | 334.8 | 318.9 | 3.8 | 2.4 | 4.16E+05 | — |
| 4 | 44.5 | 117.0 | 241.6 | 104.8 | 90.7 | 2.6 | 2.1 | 4.95E+03 | 0.918 |
| 5 | 25.5 | 98.0 | 265.1 | 84.2 | 63.6 | 3.8 | 2.7 | 3.91E+03 | 0.938 |
| 6 | 35.6 | 93.4 | 186.8 | 83.8 | 68.6 | 2.6 | 2.0 | 2.89E+03 | 0.922 |
| 7 | 86.0 | 221.8 | 429.8 | 200.5 | 179.1 | 2.6 | 1.9 | 4.93E+04 | — |
| 8 | 78.6 | 225.4 | 413.5 | 204.4 | 183.7 | 2.9 | 1.8 | 4.85E+04 | — |
| 9 | 72.7 | 195.0 | 405.4 | 174.8 | 144.6 | 2.7 | 2.1 | 4.67E+04 | — |
| 10 | 86.8 | 227.8 | 418.4 | 206.6 | 193.1 | 2.6 | 1.8 | — | — |
| 11 | 85.3 | 226.8 | 419.5 | 205.4 | 188.3 | 2.7 | 1.9 | — | — |

TABLE III

Examples 12-22 - Polymerization Conditions.

| Example | Metallocene Compounds | 1-hexene (g) | HFB (mL) | H$_2$ (ppm) | Pressure (psi) | Temperature (° C.) | Productivity (g/g) |
|---|---|---|---|---|---|---|---|
| 12 | MET-2/MET-3 | 0 | 0 | 0 | 430 | 95 | 3010 |
| 13 | MET-2/MET-3 | 0 | 0.1 | 0 | 430 | 95 | 5860 |
| 14 | MET-2/MET-3 | 0 | 0.3 | 0 | 430 | 95 | 6010 |
| 15 | MET-2/MET-3 | 5 | 0 | 100 | 370 | 85 | 4760 |
| 16 | MET-2/MET-3 | 5 | 0.1 | 100 | 370 | 85 | 5440 |
| 17 | MET-2/MET-3 | 5 | 0.3 | 100 | 370 | 85 | 3900 |
| 18 | MET-2/MET-3 | 5 | 0 | 150 | 402 | 90 | 3560 |
| 19 | MET-2/MET-3 | 5 | 0.1 | 150 | 402 | 90 | 4500 |
| 20 | MET-2/MET-4 | 10 | 0 | 150 | 430 | 95 | 1310 |
| 21 | MET-2/MET-4 | 10 | 0.1 | 150 | 430 | 95 | 2830 |
| 22 | MET-2/MET-4 | 10 | 0.3 | 150 | 430 | 95 | 3390 |

TABLE IV

Examples 18-19 - Polymer Properties.

| Example | Mn/1000 (g/mol) | Mw/1000 (g/mol) | Mz/1000 (g/mol) | Mv/1000 (g/mol) | Mp/1000 (g/mol) | Mw/Mn | Mz/Mw | $\eta_0$ (Pa-sec) | Density (g/cc) |
|---|---|---|---|---|---|---|---|---|---|
| 18 | 19.0 | 349.6 | 851.8 | 293.5 | 430.5 | 18.4 | 2.4 | — | — |
| 19 | 20.6 | 290.9 | 629.3 | 251.3 | 307.2 | 14.1 | 2.2 | — | — |

TABLE V

Examples 23-31 - Polymerization Conditions.

| Example | Z-N Catalyst | 1-hexene (g) | HFB (mL) | H$_2$ ΔP (psig) | Pressure (psi) | Temperature (° C.) | Productivity (g/g) |
|---|---|---|---|---|---|---|---|
| 23 | ZN-1 | 10 | 0 | 150 | 375 | 90 | 49200 |
| 24 | ZN-1 | 10 | 0.05 | 150 | 375 | 90 | 72800 |
| 25 | ZN-1 | 10 | 0.1 | 150 | 375 | 90 | 79200 |
| 26 | ZN-1 | 10 | 0.5 | 150 | 375 | 90 | 70000 |
| 27 | ZN-2 | 10 | 0 | 0 | 400 | 90 | 99000 |
| 28 | ZN-2 | 10 | 0.1 | 0 | 400 | 90 | 153750 |
| 29 | ZN-2 | 10 | 0.3 | 0 | 400 | 90 | 123530 |
| 30 | ZN-2 | 0 | 0 | 0 | 400 | 90 | 60800 |
| 31 | ZN-2 | 0 | 0.1 | 0 | 400 | 90 | 77800 |

TABLE VII

Examples 32-36 - Polymerization Conditions.

| Example | Catalyst | 1-hexene (g) | HFB (mL) | H$_2$ ΔP (psig) | Pressure (psi) | Temperature (° C.) | Productivity (g/g) |
|---|---|---|---|---|---|---|---|
| 32 | Cr | 0 | 0 | 200 | 500 | 95 | 2800 |
| 33 | Cr | 0 | 0.1 | 200 | 500 | 95 | 3180 |
| 34 | Cr | 0 | 0.3 | 200 | 500 | 95 | 3380 |
| 35 | Cr | 10 | 0 | 150 | 500 | 95 | 4580 |
| 36 | Cr | 10 | 0.1 | 150 | 500 | 95 | 6140 |

TABLE VI

Examples 23-31 - Polymer Properties.

| Example | Mn/1000 (g/mol) | Mw/1000 (g/mol) | Mz/1000 (g/mol) | Mv/1000 (g/mol) | Mp/1000 (g/mol) | Mw/Mn | Mz/Mw | $\eta_0$ (Pa-sec) | Density (g/cc) |
|---|---|---|---|---|---|---|---|---|---|
| 23 | 35.1 | 217.4 | 895 | 175.4 | 95.0 | 6.2 | 4.1 | 5.78E+04 | 0.9548 |
| 24 | 32.5 | 174.0 | 617 | 143.2 | 84.9 | 5.4 | 3.6 | 2.28E+04 | 0.9528 |
| 25 | 31.8 | 178.9 | 637 | 146.8 | 89.2 | 5.6 | 3.6 | 2.74E+04 | 0.9526 |
| 26 | 29.1 | 180.8 | 633 | 147.8 | 90.4 | 6.2 | 3.5 | 2.64E+04 | 0.9522 |
| 27 | 129.3 | 861.1 | 2684 | 702.2 | 478.8 | 6.7 | 3.1 | — | 0.9324 |
| 28 | 121.4 | 789.8 | 2692 | 634.8 | 439.1 | 6.5 | 3.4 | — | 0.9358 |
| 29 | — | — | — | — | — | — | — | — | — |
| 30 | 113.7 | 952.8 | 2762 | 787.2 | 522.0 | 8.4 | 2.9 | — | 0.9427 |
| 31 | 160.2 | 949.0 | 2737 | 785.9 | 515.6 | 5.9 | 2.9 | — | 0.9415 |

TABLE VIII

Examples 32-36 - Polymer Properties.

| Example | Mn/1000 (g/mol) | Mw/1000 (g/mol) | Mz/1000 (g/mol) | Mv/1000 (g/mol) | Mp/1000 (g/mol) | Mw/Mn | Mz/Mw | $\eta_0$ (Pa-sec) | Density (g/cc) |
|---|---|---|---|---|---|---|---|---|---|
| 32 | 42.4 | 416.5 | 1496 | 337.3 | 339.5 | 9.8 | 3.6 | 6.97E+05 | 0.9536 |
| 33 | 39.8 | 411.6 | 1597 | 330.0 | 245.2 | 10.3 | 3.9 | 6.06E+05 | 0.9534 |
| 34 | 40.9 | 370.8 | 1296 | 300.5 | 239.1 | 9.1 | 3.5 | 4.77E+05 | 0.9538 |
| 35 | 50.9 | 461.2 | 1538 | 376.3 | 384.7 | 9.1 | 3.3 | 1.21E+06 | 0.9490 |
| 36 | 49.8 | 460.6 | 1618 | 374.2 | 404.4 | 9.2 | 3.5 | 1.12E+06 | 0.9499 |

TABLE IX

Examples 37-40 - Polymerization Conditions.

| Example | 1-hexene (g) | HFB (mL) | PFH (mL) | TFMTMS (mL) | H$_2$ (ppm) | Pressure (psig) | Temp (° C.) | Productivity (g/g) |
|---|---|---|---|---|---|---|---|---|
| 37 | 50 | | | | 0 | 320 | 80 | 930 |
| 38 | 50 | 0.2 | | | 0 | 320 | 80 | 1820 |
| 39 | 50 | | 0.2 | | 0 | 320 | 80 | 1810 |
| 40 | 50 | | | 0.2 | 0 | 320 | 80 | 0 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process for producing an olefin polymer at a target productivity, the process comprising:

(a) contacting a transition metal-based catalyst system with an olefin monomer and an optional olefin comonomer in a polymerization reactor system under polymerization conditions; and (b) controlling an amount of a halogenated hydrocarbon compound introduced into the polymerization reactor system to produce the olefin polymer at the target productivity.

Aspect 2. A method of controlling a polymerization reaction in a polymerization reactor system, the method comprising:

(i) contacting a transition metal-based catalyst system with an olefin monomer and an optional olefin comonomer in the polymerization reactor system under polymerization conditions to produce an olefin polymer; and (ii) introducing an amount of a halogenated hydrocarbon compound into the polymerization reactor system to increase a productivity of the olefin polymer.

Aspect 3. The method or process defined in aspect 1 or 2, wherein the productivity of the olefin polymer increases as the amount of the halogenated hydrocarbon compound added to the polymerization reactor system increases.

Aspect 4. The method or process defined in any one of aspects 1-3, wherein the productivity is increased by any amount disclosed herein as a result of the halogenated hydrocarbon compound, e.g., from about 5% to about 350%, from about 10% to about 300%, from about 20% to about 250%, or from about 35% to about 200%.

Aspect 5. An olefin polymerization process, the process comprising:

contacting a transition metal-based catalyst system with an olefin monomer and an optional olefin comonomer in a polymerization reactor system under polymerization conditions, and in the presence of a halogenated hydrocarbon compound, to produce an olefin polymer; wherein:

a productivity of the olefin polymer is greater than that obtained under the same polymerization conditions without the halogenated hydrocarbon compound.

Aspect 6. The process defined in aspect 5, wherein the productivity is greater by any amount disclosed herein, e.g., from about 5% to about 350%, from about 10% to about 300%, from about 20% to about 250%, or from about 35% to about 200%.

Aspect 7. The method or process defined in any one of aspects 1-6, further comprising the steps of determining (or measuring) the productivity, and adjusting the amount of the halogenated hydrocarbon compound introduced into the polymerization reactor system based on the difference between the measured productivity and the target productivity.

Aspect 8. The method or process defined in any one of aspects 1-7, wherein the olefin monomer comprises a $C_2$-$C_{20}$ olefin.

Aspect 9. The method or process defined in any one of aspects 1-7, wherein the olefin monomer and the olefin comonomer independently comprise a $C_2$-$C_{20}$ alpha-olefin.

Aspect 10. The method or process defined in any one of aspects 1-9, wherein the olefin monomer comprises ethylene or propylene.

Aspect 11. The method or process defined in any one of aspects 1-10, wherein the catalyst system is contacted with ethylene and a $C_3$-$C_{10}$ alpha-olefin comonomer.

Aspect 12. The method or process defined in any one of aspects 1-10, wherein the catalyst system is contacted with ethylene and a comonomer comprising 1-butene, 1-hexene, 1-octene, or a mixture thereof.

Aspect 13. The method or process defined in any one of aspects 1-12, wherein the polymerization reactor system comprises a batch reactor, a slurry reactor, a gas-phase reactor, a solution reactor, a high pressure reactor, a tubular reactor, an autoclave reactor, or a combination thereof.

Aspect 14. The method or process defined in any one of aspects 1-13, wherein the polymerization reactor system comprises a slurry reactor, a gas-phase reactor, a solution reactor, or a combination thereof.

Aspect 15. The method or process defined in any one of aspects 1-14, wherein the polymerization reactor system comprises a loop slurry reactor.

Aspect 16. The method or process defined in any one of aspects 1-15, wherein the polymerization reactor system comprises a single reactor.

Aspect 17. The method or process defined in any one of aspects 1-15, wherein the polymerization reactor system comprises 2 reactors (e.g., in series).

Aspect 18. The method or process defined in any one of aspects 1-15, wherein the polymerization reactor system comprises more than 2 reactors.

Aspect 19. The method or process defined in any one of aspects 1-18, wherein the halogenated hydrocarbon compound comprises any suitable halogenated hydrocarbon compound or any halogenated hydrocarbon compound disclosed herein, e.g., a halogenated aromatic compound, a halogenated alkane compound, or combinations thereof.

Aspect 20. The method or process defined in any one of aspects 1-19, wherein the halogenated hydrocarbon compound comprises a halogenated aromatic compound, e.g., hexachlorobenzene, hexafluorobenzene, or combinations thereof.

Aspect 21. The method or process defined in any one of aspects 1-19, wherein the halogenated hydrocarbon compound comprises a halogenated alkane compound, e.g., carbon tetrachloride, carbon tetrafluoride, heptafluoropropane, decafluorobutane, hexafluoroethane, perfluorohexane, or combinations thereof.

Aspect 22. The method or process defined in any one of aspects 1-19, wherein the halogenated hydrocarbon compound comprises a chlorine/fluorine-containing compound (or chlorofluorocarbon).

Aspect 23. The method or process defined in any one of aspects 1-22, wherein the halogenated hydrocarbon compound has a boiling point in any range disclosed herein, e.g., at least 25° C., at least 110° C., in range from 25° C. to 100° C., or in a range from 110° C. to 200° C.

Aspect 24. The method or process defined in any one of aspects 1-23, wherein the halogenated hydrocarbon compound is a liquid at a temperature in any range disclosed herein, e.g., from 60° C. to 130° C., from 60° C. to 120° C., from 60° C. to 95° C., or from 70° C. to 110° C., at a pressure of 500 psig (3.45 MPa).

Aspect 25. The method or process defined in any one of aspects 1-24, wherein the halogenated hydrocarbon compound is miscible with or soluble in any $C_3$ to $C_{10}$ hydrocarbon solvent disclosed herein, e.g., propane, cyclohexane, isobutane, n-butane, n-pentane, isopentane, neopentane, n-hexane, or benzene, as well as mixtures thereof.

Aspect 26. The method or process defined in any one of aspects 1-25, wherein the amount of the halogenated hydrocarbon compound introduced into the polymerization reactor system is in any range of weight ratios disclosed herein, based on the weight of the halogenated hydrocarbon compound to the weight of the catalyst system, e.g., from about 0.01:1 to about 200:1, from about 0.05:1 to about 40:1, or from about 0.5:1 to about 20:1.

Aspect 27. The method or process defined in any one of aspects 1-26, wherein the amount of the halogenated hydrocarbon compound introduced into the polymerization reactor system is in any range of weight ratios (in ppm) disclosed herein, based on the weight of the halogenated hydrocarbon compound to the weight of the reactor contents, e.g., from about 1 ppm to about 5000 ppm, from about 5 ppm to about 2000 ppm, from about 10 ppm to about 500 ppm, or from about 15 ppm to about 250 ppm.

Aspect 28. The method or process defined in any one of aspects 1-27, wherein the olefin polymer is an ethylene homopolymer, an ethylene copolymer, a propylene homopolymer, or a propylene-based copolymer.

Aspect 29. The method or process defined in any one of aspects 1-28, wherein the olefin polymer is an ethylene homopolymer, an ethylene/1-butene copolymer, an ethylene/1-hexene copolymer, or an ethylene/1-octene copolymer.

Aspect 30. The method or process defined in any one of aspects 1-29, wherein the olefin polymer is an ethylene/1-hexene copolymer.

Aspect 31. The method or process defined in any one of aspects 1-30, wherein the transition metal-based catalyst system is a chromium-based catalyst system, a Ziegler-Natta based catalyst system, a metallocene-based catalyst system, or a combination thereof.

Aspect 32. The method or process defined in any one of aspects 1-31, wherein the transition metal-based catalyst system comprises chromium, vanadium, titanium, zirconium, hafnium, or a combination thereof.

Aspect 33. The method or process defined in any one of aspects 1-32, wherein the transition metal-based catalyst system comprises a solid oxide.

Aspect 34. The method or process defined in any one of aspects 1-33, wherein the transition metal-based catalyst system comprises any (one or more) transition metal compound, any (one or more) activator, and optionally any (one or more) co-catalyst disclosed herein.

Aspect 35. The method or process defined in any one of aspects 1-34, wherein the transition metal-based catalyst system comprises any metallocene catalyst component, any (one or more) activator, and optionally any (one or more) co-catalyst disclosed herein.

Aspect 36. The method or process defined in any one of aspects 1-34, wherein the catalyst system comprises any (one or more) first metallocene catalyst component, any (one or more) second metallocene catalyst component, any (one or more) activator, and any (one or more) co-catalyst disclosed herein.

Aspect 37. The method or process defined in aspect 36, wherein the first metallocene catalyst component and the second metallocene catalyst component independently comprise titanium, zirconium, hafnium, or a combination thereof.

Aspect 38. The method or process defined in any one of aspects 34-37, wherein the activator comprises an aluminoxane compound, an organoboron or organoborate compound, an ionizing ionic compound, an activator-support, or any combination thereof.

Aspect 39. The method or process defined in any one of aspects 34-38, wherein the activator comprises an aluminoxane compound.

Aspect 40. The method or process defined in any one of aspects 34-38, wherein the activator comprises an organoboron or organoborate compound.

Aspect 41. The method or process defined in any one of aspects 34-38, wherein the activator comprises an ionizing ionic compound.

Aspect 42. The method or process defined in any one of aspects 34-38, wherein the activator comprises an activator-support comprising a solid oxide treated with an electron-withdrawing anion, for example, an activator-support comprising any solid oxide treated with any electron-withdrawing anion disclosed herein.

Aspect 43. The method or process defined in aspect 42, wherein the activator-support comprises a fluorided solid oxide, a sulfated solid oxide, or a combination thereof.

Aspect 44. The method or process defined in aspect 42, wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, phosphated silica-coated alumina, or any combination thereof.

Aspect 45. The method or process defined in aspect 42, wherein the activator-support comprises fluorided alumina, sulfated alumina, fluorided silica-alumina, sulfated silica-alumina, fluorided silica-zirconia, fluorided-chlorided silica-coated alumina, fluorided silica-coated alumina, sulfated silica-coated alumina, or any combination thereof.

Aspect 46. The method or process defined in any one of aspects 34-45, wherein the catalyst system comprises any organoaluminum co-catalyst disclosed herein.

Aspect 47. The method or process defined in aspect 46, wherein the organoaluminum co-catalyst comprises trimethylaluminum, triethylaluminum, tri-n-propyl aluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Aspect 48. The method or process defined in aspect 46 or 47, wherein the organoaluminum co-catalyst comprises triethylaluminum.

Aspect 49. The method or process defined in aspect 46 or 47, wherein the organoaluminum co-catalyst comprises triisobutylaluminum.

Aspect 50. The method or process defined in any one of aspects 1-49, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 51. The method or process defined in any one of aspects 1-50, wherein the polymerization conditions are substantially constant, for example, for a particular polymer grade.

Aspect 52. The method or process defined in any one of aspects 1-50, further comprising a step of adjusting at least one polymerization condition, e.g., temperature, pressure, or residence time.

Aspect 53. The method or process defined in any one of aspects 1-52, wherein hydrogen is added to the polymerization reactor system, and optionally, the hydrogen addition is substantially constant, for example, for a particular polymer grade.

Aspect 54. The method or process defined in any one of aspects 1-53, further comprising a step of adding hydrogen to the polymerization reactor system to reduce the weight-average molecular weight (Mw) of the olefin polymer.

Aspect 55. The method or process defined in any one of aspects 1-54, further comprising a step of adding hydrogen to the polymerization reactor system to increase the melt index (MI) of the olefin polymer.

Aspect 56. The method or process defined in any one of aspects 1-52, wherein no hydrogen is added to the polymerization reactor system.

Aspect 57. The method or process defined in any one of aspects 1-56, wherein the halogenated hydrocarbon compound is introduced into the polymerization reactor system continuously.

Aspect 58. The method or process defined in any one of aspects 1-56, wherein the halogenated hydrocarbon compound is introduced into the polymerization reactor system periodically.

Aspect 59. The method or process defined in any one of aspects 1-58, wherein the weight-average molecular weight (Mw) and/or the zero-shear viscosity of the olefin polymer decrease(s) as the amount of the halogenated hydrocarbon compound added to the polymerization reactor system increases.

Aspect 60. The method or process defined in any one of aspects 1-59, wherein the melt index (MI) of the olefin polymer (e.g., in step (ii) or step (b)) is in any range disclosed herein, e.g., from 0 g/10 min to about 25 g/10 min, from 0 g/10 min to about 1 g/10 min, or from about 0.1 g/10 min to about 2 g/10 min.

Aspect 61. The method or process defined in any one of aspects 1-60, wherein the weight-average molecular weight (Mw) of the olefin polymer (e.g., in step (ii) or step (b)) is in any range disclosed herein, e.g., from about 50,000 g/mol to about 1,000,000 g/mol, from about 100,000 g/mol to about 900,000 g/mol, or from about 150,000 g/mol to about 750,000 g/mol.

Aspect 62. The method or process defined in any one of aspects 1-61, wherein the density of the olefin polymer (e.g., in step (ii) or step (b)) is in any range disclosed herein, e.g., from about 0.88 g/cc to about 0.97 g/cc, from about 0.91 g/cc to about 0.96 g/cc, or from about 0.92 g/cc to about 0.95 g/cc.

We claim:

1. A method of controlling a polymerization reaction in a polymerization reactor system, the method comprising:
   (i) contacting a transition metal-based catalyst system with an olefin monomer and an optional olefin comonomer in the polymerization reactor system under polymerization conditions to produce an olefin polymer; and
   (ii) introducing an amount of a halogenated hydrocarbon compound into the polymerization reactor system to increase a productivity of the olefin polymer; wherein:
   the polymerization reactor system comprises a single reactor or two reactors;
   the halogenated hydrocarbon compound comprises perfluorohexane, hexafluorobenzene, or both; and
   the transition metal-based catalyst system is a chromium-based catalyst system, a metallocene-based catalyst system, or a combination thereof.

2. The method of claim 1, wherein the amount of the halogenated hydrocarbon compound introduced into the polymerization reactor system is in a range from about 5 ppm to about 2000 ppm, based on the weight of the halogenated hydrocarbon compound to the weight of contents of the polymerization reactor system.

3. The method of claim 1, wherein the polymerization reactor system comprises a slurry reactor, a gas-phase reactor, a solution reactor, or a combination thereof.

4. The method of claim 1, wherein the transition metal-based catalyst system is contacted with ethylene and an olefin comonomer comprising a $C_3$-$C_{10}$ alpha-olefin.

5. The method of claim 1, further comprising measuring the productivity, and adjusting the amount of the halogenated hydrocarbon compound introduced into the polymerization reactor system based on a difference between the measured productivity and a target productivity.

6. The method of claim 1, wherein the amount of the halogenated hydrocarbon compound introduced into the polymerization reactor system is in a range from about 0.01:1 to about 50:1, based on the weight of the halogenated hydrocarbon compound to the weight of the transition metal-based catalyst system.

7. The method of claim 1, further comprising a step of adding hydrogen to the polymerization reactor system to increase the melt index (MI) of the olefin polymer, reduce the weight-average molecular weight (Mw) of the olefin polymer, or both.

8. The method of claim 1, wherein the introduction of the halogenated hydrocarbon compound into the polymerization reactor system increases the productivity of the olefin polymer by from about 5% to about 350%.

9. The method of claim 1, wherein the introduction of the halogenated hydrocarbon compound into the polymerization reactor system decreases the weight-average molecular weight (Mw) of the olefin polymer, decreases the zero-shear viscosity of the olefin polymer, or both.

10. A process for producing an olefin polymer at a target productivity, the process comprising:
   (a) contacting a transition metal-based catalyst system with an olefin monomer and an optional olefin comonomer in a polymerization reactor system under polymerization conditions; and
   (b) controlling an amount of a halogenated hydrocarbon compound introduced into the polymerization reactor system to produce the olefin polymer at the target productivity; wherein:
   the transition metal-based catalyst system comprises one or two metallocene compounds; and
   the polymerization reactor system comprises a loop slurry reactor.

11. The process of claim 10, wherein the productivity of the olefin polymer increases as the amount of the halogenated hydrocarbon compound added to the polymerization reactor system increases.

12. The process of claim 10, wherein the Mw and zero-shear viscosity of the olefin polymer decrease as the amount of the halogenated hydrocarbon compound added to the polymerization reactor system increases.

13. The process of claim 10, wherein:
   the halogenated hydrocarbon compound comprises a halogenated aromatic compound, a halogenated alkane compound, or a combination thereof; and
   the olefin polymer comprises an ethylene homopolymer, an ethylene/1-butene copolymer, an ethylene/1-hexene copolymer, or an ethylene/1-octene copolymer.

14. The process of claim 10, wherein:
   the amount of the halogenated hydrocarbon compound introduced into the polymerization reactor system is in a range from about 5 ppm to about 2000 ppm, based on the weight of the halogenated hydrocarbon compound to the weight of contents of the polymerization reactor system; or
   the amount of the halogenated hydrocarbon compound introduced into the polymerization reactor system is in a range from about 0.2:1 to about 8:1, based on the weight of the halogenated hydrocarbon compound to the weight of the transition metal-based catalyst system; or both.

15. The process of claim 10, wherein:
   a productivity of the olefin polymer increases as the amount of the halogenated hydrocarbon compound added to the polymerization reactor system increases;
   the halogenated hydrocarbon compound comprises a halogenated aromatic compound;
   the olefin polymer comprises an ethylene polymer; and
   the amount of the halogenated hydrocarbon compound introduced into the polymerization reactor system is in a range from about 5 ppm to about 2000 ppm, based on the weight of the halogenated hydrocarbon compound to the weight of contents of the polymerization reactor system.

16. The process of claim 10, wherein:
   a productivity of the olefin polymer increases as the amount of the halogenated hydrocarbon compound added to the polymerization reactor system increases;
   the halogenated hydrocarbon compound comprises a halogenated alkane compound;
   the olefin polymer comprises an ethylene polymer; and
   the amount of the halogenated hydrocarbon compound introduced into the polymerization reactor system is in a range from about 0.2:1 to about 8:1, based on the weight of the halogenated hydrocarbon compound to the weight of the transition metal-based catalyst system.

17. An olefin polymerization process, the process comprising:
   contacting a transition metal-based catalyst system with an olefin monomer and an optional olefin comonomer in a polymerization reactor system under polymerization conditions, and in the presence of a halogenated hydrocarbon compound, to produce an olefin polymer; wherein:
   a productivity of the olefin polymer is greater than that obtained under the same polymerization conditions without the halogenated hydrocarbon compound;
   the halogenated hydrocarbon compound comprises perfluorohexane, hexafluorobenzene, or both; and
   the transition metal-based catalyst system is a chromium-based catalyst system, a metallocene-based catalyst system, or a combination thereof.

18. The process of claim 17, wherein the productivity of the olefin polymer is greater by from about 20% to about 250%.

19. The process of claim 17, wherein:
   the olefin polymer comprises an ethylene polymer.

20. The process of claim 19, wherein the polymerization reactor system comprises a slurry reactor, a gas-phase reactor, a solution reactor, or a combination thereof.

21. The process of claim 18, wherein:
   the olefin polymer comprises an ethylene polymer; and
   the polymerization reactor system comprises a slurry reactor, a gas-phase reactor, a solution reactor, or a combination thereof.

22. The process of claim 21, wherein the polymerization reactor system comprises a loop slurry reactor.

* * * * *